United States Patent [19]
Miyazaki et al.

[11] Patent Number: 5,621,628
[45] Date of Patent: Apr. 15, 1997

[54] POWER CONVERTER

[75] Inventors: Satoshi Miyazaki, Kanagawa-ken; Kazuaki Yuki, Tokyo, both of Japan

[73] Assignee: Kabushiki Kaisha Toshiba, Kawasaki, Japan

[21] Appl. No.: 659,373

[22] Filed: Jun. 6, 1996

[30] Foreign Application Priority Data

Jun. 13, 1995 [JP] Japan .................................. 7-145755
Mar. 12, 1996 [JP] Japan .................................. 8-055032

[51] Int. Cl.$^6$ ............................................... H02M 5/453
[52] U.S. Cl. ............................................ 363/37; 363/89
[58] Field of Search ................................ 324/141–142, 324/117, 127; 364/483; 363/37, 39, 40–41, 44, 45, 95–97, 98, 79, 84, 87, 89, 131, 132, 127, 128, 16, 17; 323/207

[56] References Cited

U.S. PATENT DOCUMENTS

| | | | |
|---|---|---|---|
| 5,367,448 | 11/1994 | Carroll | 363/89 |
| 5,414,613 | 5/1995 | Chen | 363/52 |
| 5,446,641 | 8/1995 | Reynolds et al. | 363/17 |
| 5,514,915 | 5/1996 | Kim et al. | 307/64 |

*Primary Examiner*—Aditya Krishnan
*Attorney, Agent, or Firm*—Oblon, Spivak, McClelland, Maier & Neustadt, P.C.

[57] ABSTRACT

A power converter including, a converter, a three-level DC voltage source composed of a series connected capacitors connected between outputs of the converter to generate a positive, a neutral and a negative potential, a three-level NPC inverter, a chopper circuit, and a chopper control circuit. The chopper circuit includes a series circuit of a first and a second switching device connected between a positive and a negative potential points of the three-level DC voltage source, a first and a second diode connected in antiparallel with the first and second switching devices, respectively, and a reactor connected between a neutral potential point and a connecting point of the first and second switching devices. The chopper control circuit includes a first and a second voltage detector for detecting a first and a second voltages between the capacitors, respectively, a voltage controller for comparing the first and second voltages and for generating a voltage control output signal so that a voltage difference becomes zero, and a control circuit for driving the first and second switching devices based on the voltage control output signal. Whereby the fluctuation of the neutral potential of the three-level DC power source is suppressed.

17 Claims, 18 Drawing Sheets

POWER CONVERTER

BACKGROUND OF THE INVENTION

1. Field of the Invention

This invention relates to a power converter using an NPC inverter (Neutral Point Clamped Inverter), and more particularly to a power converter which can suppress the fluctuation of a neutral potential of a three-level DC voltage source.

2. Description of the Related Art

One example of a main circuit of a conventional power converter using an NPC (Neutral Point Clamped Type) inverter is shown in FIG. 15. In FIG. 15, AC voltage supplied from a three-phase AC power source 41 is converted to DC voltage by a converter 1, divided by capacitors 4, 5. Here, capacitors 4, 5 forms a three-level DC voltage source and DC voltages thereof having a positive side potential VP, a neutral potential VO and a negative side potential VN are output. DC voltages having this neutral potential VO are converted to a three-phase AC voltage of prescribed frequency by an NPC inverter 2 for driving an AC motor 3. NPC inverter 2 is known as an inverter to convert DC voltages having neutral potential VO to AC power with less higher harmonics.

In this case, AC power supplied to AC motor 3 from a positive side voltage (VP-VO) and a negative side voltage (VO-VN) by NPC inverter 2 is not equal at any instantaneous time and fluctuates at frequency that is 3 times of an output frequency of NPC inverter 2. Converter 1 is able to control only positive-negative voltage (VP-VN) and therefore, neutral potential VO also fluctuates at 3 times of the output frequency. When neutral voltage VO fluctuates, the feature of the NPC inverter to suppress higher harmonics is lost, and therefore, various methods are being studied to suppress the fluctuation of neutral potential VO.

For instance, such a control system is used to suppress fluctuation of neutral potential VO as "PWM System of Three-Level GTO Inverter", Industrial Application Section No. 85 disclosed at the National Meeting of the Institute of Electrical Engineers of Japan, 1994, as follows. That is, voltages in three phases are biased while line voltages of three-phase NPC inverter kept unchanged, and powers supplied from positive side voltage (VP-VO) and negative side voltage (VO-VN) are balanced by shifting this bias voltage to positive and negative sides in a short cycle.

Specifically, to cope with this fluctuation of neutral potential of a three-level DC voltage source, a method to apply bias to output voltage reference of an NPC inverter was so far used. FoP instance, if positive side voltage of a DC voltage source becomes larger than negative side voltage, positive bias is applied to voltage reference. As a result, positive side DC power consumption increases more than negative side DC power consumption and thus, positive side and negative side DC voltages can be balanced.

A definite construction will be explained referring to FIG. 15. From the difference between a positive side voltage Vd1 and a negative side voltage Vd2 obtained from a positive side DC voltage detector 20 to detect the voltage of positive side capacitor 4 and a negative side DC voltage detector 21 to detect the voltage of negative side capacitor 5, a positive-negative differential voltage is obtained and is input to a bias regulator 44. Fluctuation of neutral potential was suppressed by controlling NPC inverter 2 based on the sums of this positive-negative differential voltage and three-phase voltage references VU*, VV* and VW* computed by a three-phase voltage reference computing unit 40.

However, according to this conventional method, as bias is applied to output voltage of NPC inverter 2, when heavy loaded (when overcurrent is applied), voltage may restricted and bias may not be compensated in some case. In this case, there is such a problem that compensation of neutral potential fluctuation is not preferentially controlled but effectively controlled only when sufficient output voltage is available, and if large load current flows in a moment because of sudden change in load, etc., neutral potential fluctuates largely and overvoltage/overcurrent is induced.

Furthermore, according to such a system to suppress neutral potential fluctuation by unbalancing positive and negative side voltage consumptions by applying a bias to three-phase voltage references, voltage actually given as three-phase line voltage will become smaller than DC link voltage by bias. Therefore, voltage utilization factor drops and an NPC inverter with large voltage capacity becomes necessary. As a result, a power converter system as a whole will become large.

SUMMARY OF THE INVENTION

Accordingly, one object of this invention is to provide a power converter using an NPC inverter which can suppress the fluctuation of a neutral potential of a three-level DC voltage source.

These and other objects of this invention can be achieved by providing a power converter including, a converter, a three-level DC voltage source composed of a series connected capacitors connected between outputs of the converter to generate a positive potential, a neutral potential and a negative potential, a three-level NPC inverter connected to the three-level DC voltage source, a chopper circuit, and a chopper control circuit for controlling the chopper circuit. The chopper circuit includes a series circuit of a first switching device and a second switching device connected between a positive potential point and a negative potential point of the three-level DC voltage source, a first diode connected in antiparallel with the first switching device, a second diode connected in antiparallel with the second switching device, and a reactor. An anode of the first switching device is connected to the positive side potential point of the three-level DC voltage source, a cathode of the first switching device is connected to an anode of the second switching device, a cathode of the second switching device is connected to the negative side potential point of the three-level DC voltage source, and the reactor is connected between a neutral potential point of the three-level DC voltage source and a connecting point of the first and second switching devices. The chopper control circuit includes a first voltage detector for detecting a first voltage between one of the capacitors, a second voltage detector for detecting a second voltage between the other of the capacitors, a voltage controller connected to receive the first voltage and the second voltage for comparing the first voltage with the second voltage to generate a voltage difference and for generating a voltage control output signal so that the voltage difference becomes zero, and a control circuit connected to receive the voltage control output signal for driving the first and second switching devices based on the voltage control output signal. Whereby the fluctuation of the neutral potential of the three-level DC power source is suppressed.

According to one aspect of this invention, there is provided a power converter including, a converter, a three-level DC voltage source composed of a series connected capacitors connected between outputs of the converter to generate a positive potential, a neutral potential and a negative potential, a three-level NPC inverter connected to the three-level DC voltage source, a chopper circuit and a chopper control circuit for controlling the chopper circuit. The chopper circuit includes a series circuit of a first switching device and a second switching device connected between a positive potential point and a negative potential point of the three-level DC voltage source, a first diode connected in antiparallel with the first switching device, a second diode connected in antiparallel with the second switching device and a reactor. An anode of the first switching device is connected to the positive side potential point of the three-level DC voltage source, a cathode of the first switching device is connected to an anode of the second switching device, a cathode of the second switching device is connected to the negative side potential point of the three-level DC voltage source, and the reactor is connected between a neutral potential point of the three-level DC voltage source and a connecting point of the first and second switching devices. The chopper control circuit includes a first current detector for detecting a chopper current flowing through the reactor, a second current detector for detecting an inverter neutral current flowing between the neutral potential point of the three-level DC voltage source and a neutral potential point of the three-level NPC inverter, a comparator for comparing the inverter neutral current with the chopper current to generate a current difference therebetween, a current control circuit connected to receive the current difference for generating a current control output signal so that the current difference becomes zero, and a control circuit connected to receive the current control output signal for driving the first and second switching devices based on the current control output signal.

According to another aspect of this invention, there is provided a power converter including, a converter, a three-level DC voltage source composed of a series connected capacitors connected between outputs of the converter to generate a positive potential, a neutral potential and a negative potential, a three-level NPC inverter connected to the three-level DC voltage source, a chopper circuit and a chopper control circuit for controlling the chopper circuit. The chopper circuit includes a series circuit of a first switching device and a second switching device connected between a positive potential point and a negative potential point of the three-level DC voltage source, a first diode connected in antiparallel with the first switching device, a second diode connected in antiparallel with the second switching device, and a reactor. An anode of the first switching device is connected to the positive side potential point of the three-level DC voltage source, a cathode of the first switching device is connected to an anode of the second switching device, a cathode of the second switching device is connected to the negative side potential point of the three-level DC voltage source, and the reactor is connected between a neutral potential point of the three-level DC voltage source and a connecting point of the first and second switching devices. The chopper control circuit includes a first voltage detector for detecting a first voltage between one of the capacitors, a second voltage detector for detecting a second voltage between the other of the capacitors, a voltage comparator for comparing the first voltage with the second voltage to generate a voltage difference, a voltage controller connected to receive the voltage difference for generating a voltage control output signal so that the voltage difference becomes zero, and a control circuit connected to receive the voltage control output signal for driving the first and second switching devices based on the voltage control output signal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
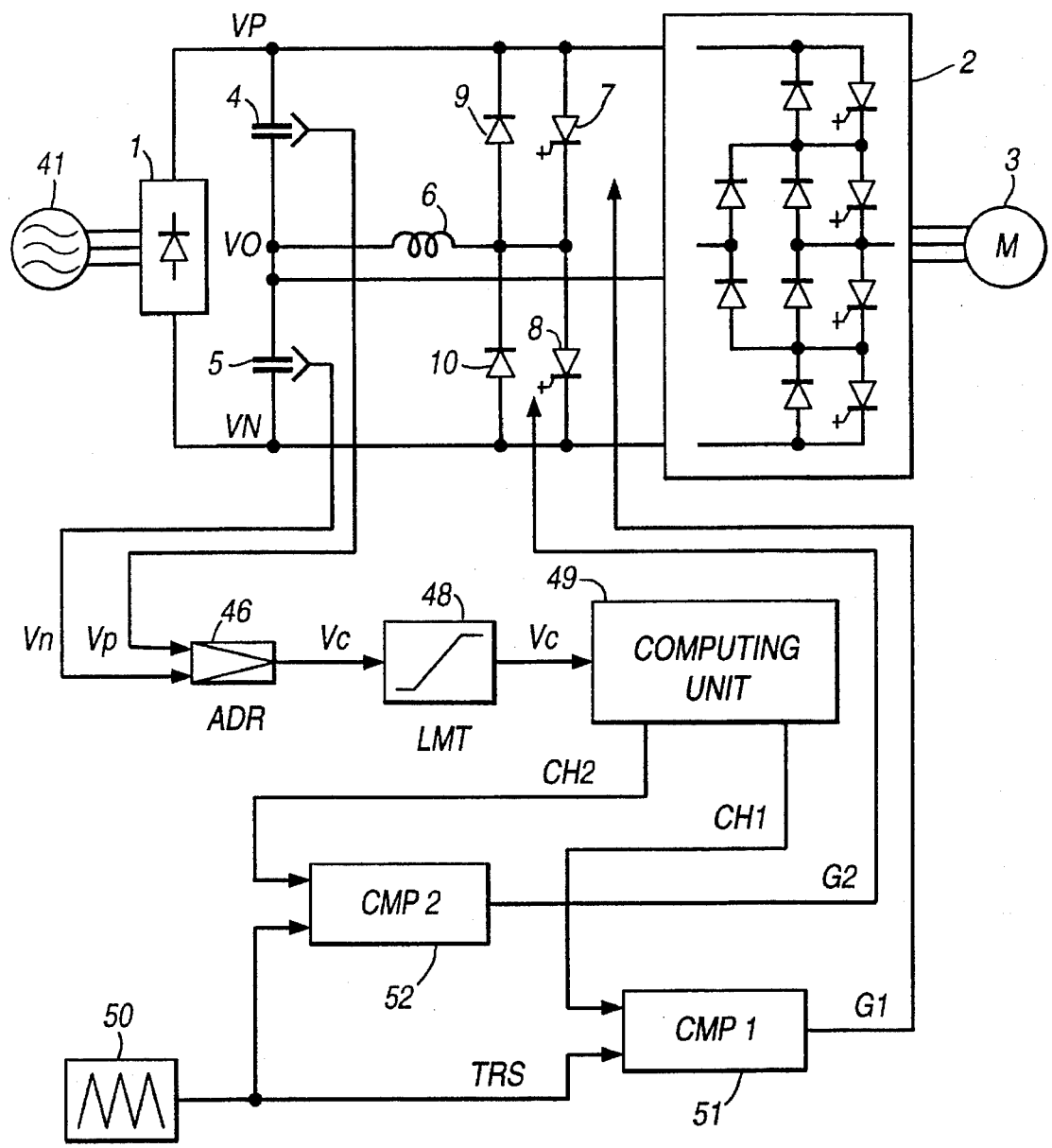
FIG. 1 is a system configuration diagram of a power converter according to a first embodiment of this invention.

Referring now to the drawings, wherein like reference numerals designate identical or corresponding parts throughout the several views, the embodiments of this invention will be described below.

FIG. 1 is a system configuration diagram of a power converter according to a first embodiment of this invention.

Figure 15:
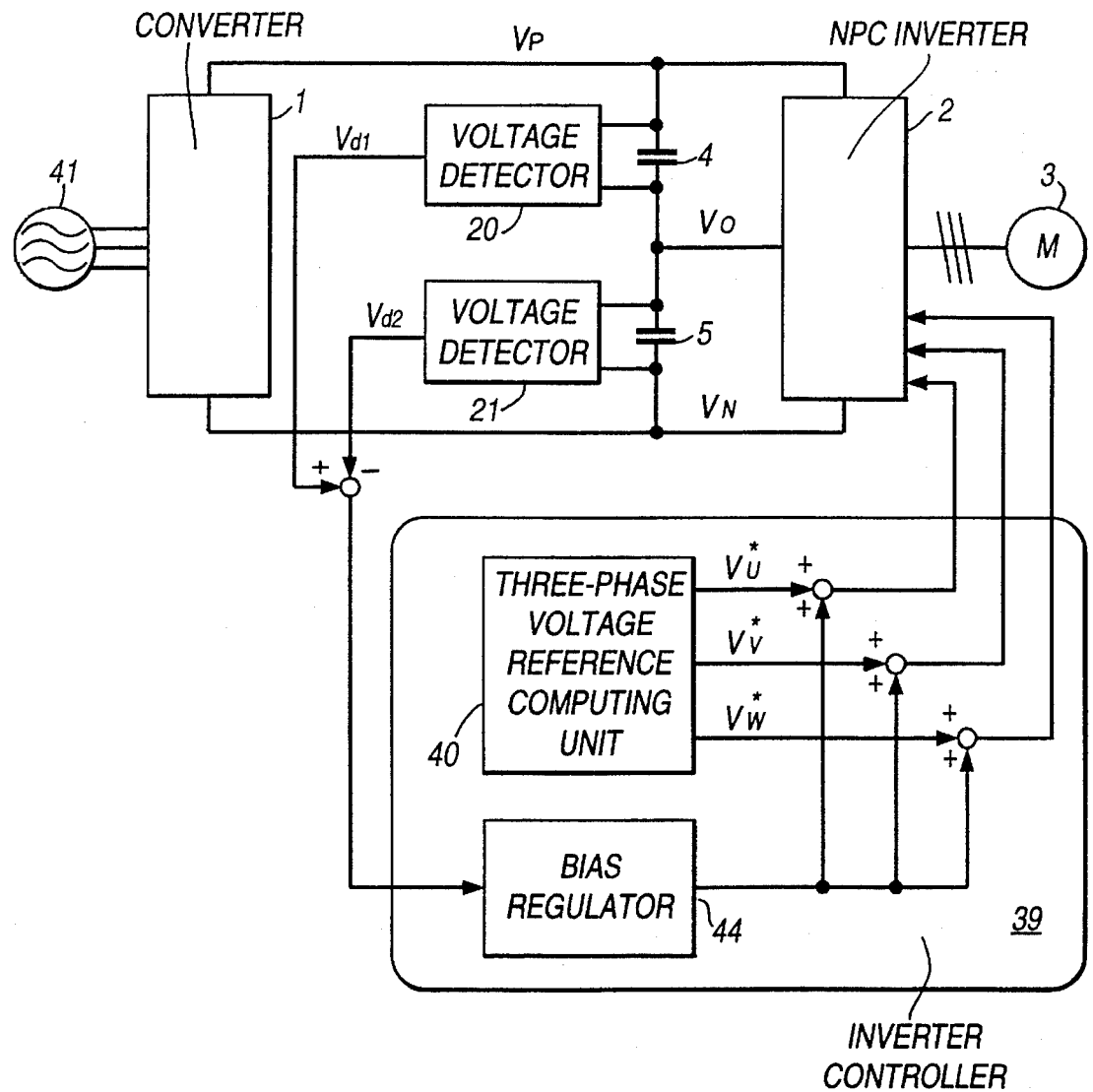
FIG. 15 is a system configuration diagram of one example of a conventional power converter.

In FIG. 1, three-phase AC power source 41, converter 1, capacitors 4 and 5, NPC inverter 2, and AC motor 3 are the same as those shown in FIG. 15. Here, capacitors 4 and 5 forms a three-level DC voltage source for NPC inverter 2.

Reference numerals 7, 8 are switching devices, such as GTOs, IGBTs, transistors, and so on, which are connected in series between the positive and negative sides of DC voltage outputted by converter 1. 9, 10 are diodes connected in antiparallel to switching devices 7, 8 respectively. 6 is a reactor connected between the series connecting point of capacitors 4, 5 and the series connecting point of switching devices 7, 8. Switching device 7, reactor 6 and diode 10 function as a first chopper circuit, while switching device 8, reactor 6 and diode 9 function as a second chopper circuit. 46 is a voltage controller to output a voltage control signal Vc by comparing absolute values of voltages Vp, Vn of capacitors 4, 5 so as to reduce a difference between them. 48 is an output limiter to limit voltage control signal Vc to a specified value. 49 is a computing unit to output either a chopper control signal CH1 or CH2 according to voltage control signal Vc that is output via output limiter 48. 50 is a modulation signal generator to output a triangular wave signal TRS for the pulse width modulation. 51, 52 are comparators to output switching signals G1, G2 by comparing chopper control signals CH1, CH2 with triangular wave signal TRS, respectively.

In the construction as described above, if a deviation is produced between voltages Vp and Vn of capaitors 4 and 5, voltage control signal Vc is output from voltage controller 46 and is input to computing unit 49 via output limiter 48. Computing unit 49 outputs either chopper control signal CH1 or CH2 according to the polarity of voltage control signal Vc and controls the switching of either switching device 7 or 8 via either comparator 51 or 52.

For instance, when voltage Vp of capacitor 4 is higher than voltage Vn of capacitor 5 and the polarity of voltage control signal Vc is positive (Vc>0), computing unit 49 outputs voltage control signal Vc as chopper control signal CH1 and makes chopper control signal CH2 zero. As a result, comparator 51 outputs switching signal G1 by comparing chopper control signal CH1 with triangular wave signal TRS, and controls the ON/OFF of switching device 7. As chopper control signal CH2 is zero, comparator 52 does not output switching signal G2. When switching device 7 is turned ON, the voltage of capacitor 4 is applied to reactor 6 and current flows through reactor 6, and when switching device 7 is turned OFF, discharge current flows from reactor 6 through capacitor 5 and diode 10, and the charge of capacitor 4 is partially moved to capacitor 5. As a result, voltage Vp of capacitor 4 drops and voltage Vn of capacitor 5 increases and thus, a deviation between voltages Vp and Vn decreases.

Further, when voltage Vp of capacitor 4 is lower than voltage Vn of capacitor 5 and the polarity of voltage control signal Vc is negative (Vc<0), computing unit 49 reverses the polarity of control signal Vc, and outputs it as chopper control signal CH2 and makes chopper control signal CH1 zero. As a result, comparator 52 compares chopper control signal CH2 with triangular wave signal TRS and outputs switching signal G2, and controls the ON/OFF of switching device 8. As chopper control signal CH1 is zero, comparator 51 does not output switching signal G1. When switching device 8 is turned ON, voltage of capacitor 5 is applied to reactor 6 and current flows through reactor 6, and when switching device 8 is turned OFF, discharge current flows from reactor 6 via diode 9 and capacitor 4, and the charge of capacitor 5 is partially moved to capacitor 4. As a result, voltage Vp of capacitor 4 increases and voltage Vn of capacitor 5 drops, and a deviation between them thus decreases.

Accordingly, when a deviation is generated between voltages Vp, Vn of capacitors 4, 5, such control is performed that the neutral potential fluctuation is suppressed quickly by the chopper function to directly move energy from the higher voltage side to the lower voltage side.

Further, an output limiter 48 controls voltage control signal Vc so that the duty ratio of pulse width modulation does not exceed 50% and the current flowing to reactor 6 is returned to nearly zero within a modulation period, when voltage deviation becomes abnormally large.

Figure 2:
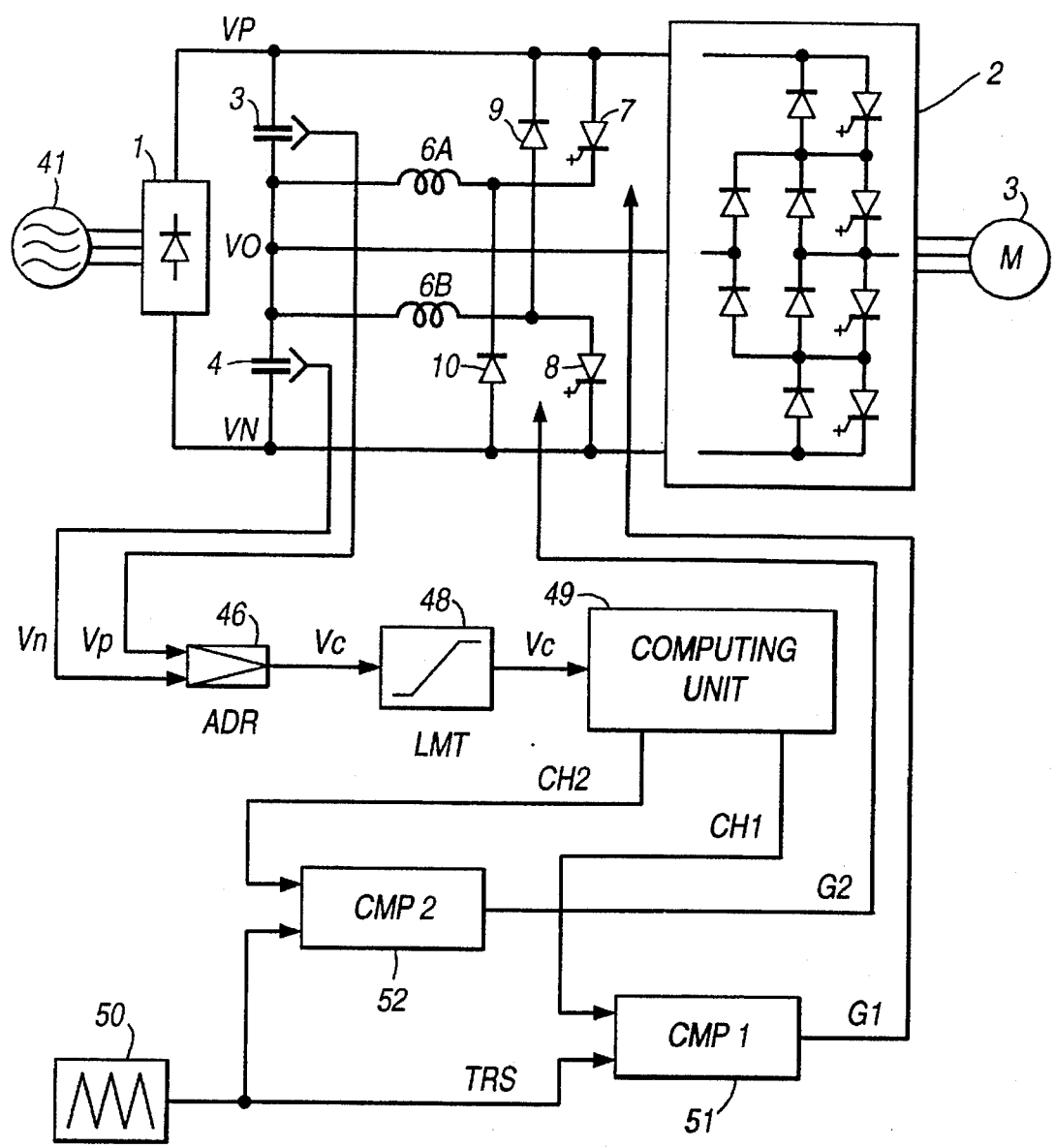
FIG. 2 is a system configuration diagram of a power converter according to a second embodiment of this invention.

FIG. 2 is a system configuration diagram of a power converter according to a second embodiment of this invention.

This embodiment is in such the construction that reactors are provided separately for a first chopper circuit and a second chopper circuit, respectively, so that both chopper circuits can be operated independently. That is, the first chopper circuit is composed by connecting a series circuit of switching device 7 and a reactor 6A between positive side VP and neutral point VO of DC voltage source and by connecting diode 10 between the series connecting point of switching device 7 and reactor 6A and negative side VN of DC voltage source. Further, the second chopper circuit is composed by connecting a series circuit of switching device 8 and a reactor 6B between negative side VN and neutral point VO of DC voltage source and by connecting diode 9 between the series connecting point of switching device 8 and reactor 6B and positive side VP of DC voltage source. All others are the same as those shown in FIG. 1.

In the construction described above, if a deviation is generated between voltages Vp, Vn of capacitors 4, 5, voltage control signal Vc is output from voltage controller 46 and is input to computing unit 49 via output limiter 48. Computing unit 49 outputs either chopper control signal CH1 or CH2 according to the polarity of voltage control signal Vc and controls the switching of either switching device 7 or 8 via either comparator 51 or 52, so as to directly move energy from the higher voltage side to the lower voltage side of capacitors 4, 5 in the same way as shown in FIG. 1. Accordingly, the neutral potential fluctuation is suppressed quickly by this chopper function.

Further, as two chopper circuits can be controlled independently in this embodiment, when the polarity of voltage deviation is reversed due to the sudden change of load current in a modulation period, it is possible to perform the control to suppress the neutral potential fluctuation by immediately operating the chopper circuit at the opposite side. For instance, when voltage Vp is larger than voltage Vn and the first chopper circuit is operating, if voltages Vp, Vn are changed such that voltage Vp is smaller than voltage Vn due to the sudden change of load current in a pulse width modulation period, it is possible to immediately operate the second chopper circuit. Therefore, it is also possible to quickly response to control such a neutral potential fluctuation that the polarity of voltage deviation is reversed in a modulation period.

Figure 3:
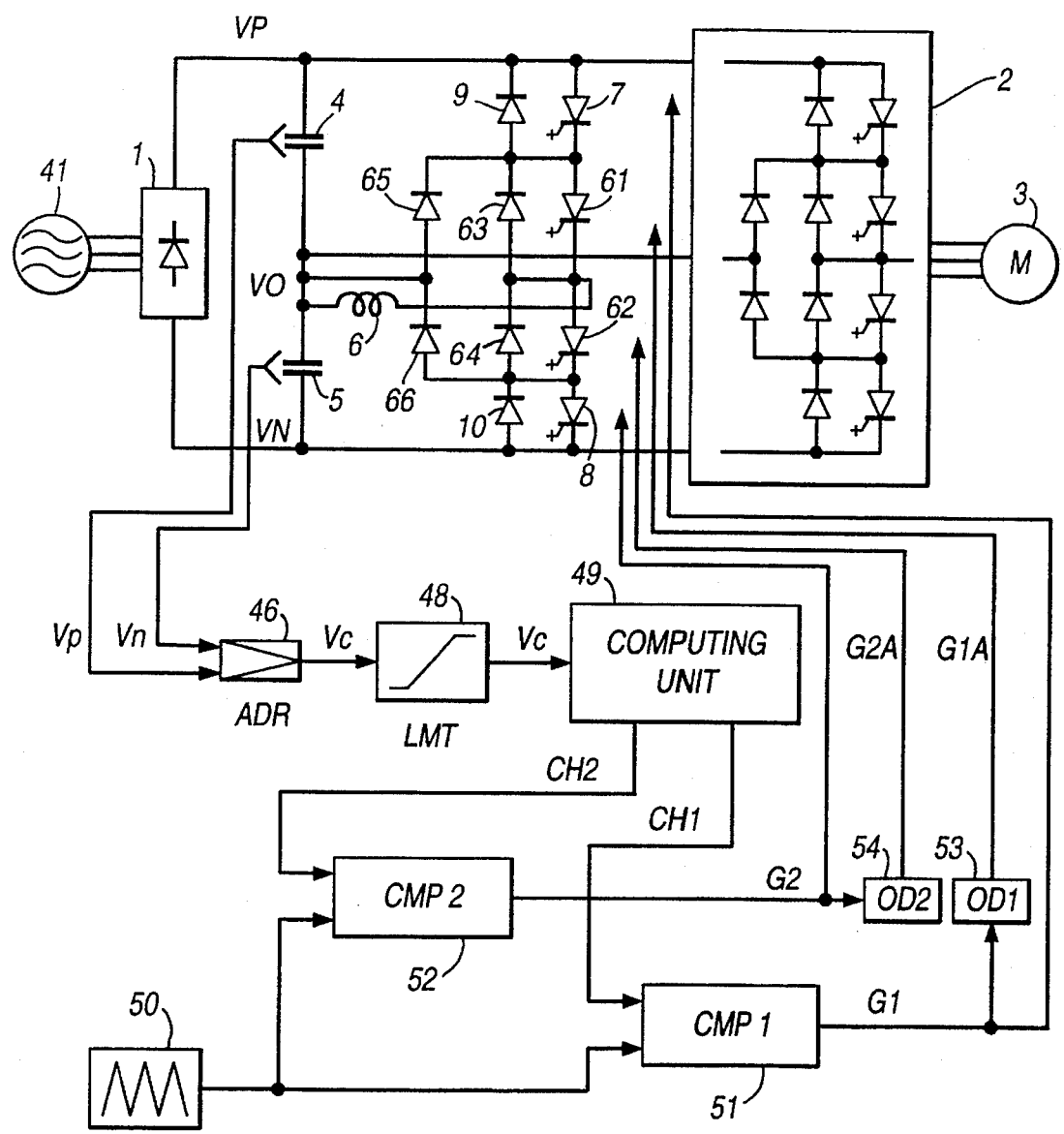
FIG. 3 is a system configuration diagram of a power converter according to a third embodiment of this invention.

FIG. 3 is a system configuration diagram of a power converter according to a third embodiment of this invention.

This embodiment is in such a construction that a part of energy of one of the capacitors is once moved to the reactor and is then moved to the other capacitor.

That is, a first arm with series connected switching devices 7, 61 and diodes 9, 63 which are connected in antiparallel respectively, and a second arm with series connected switching devices 8, 62 and diodes 10, 64, which are connected in antiparallel respectively are provided. The first arm and the second arm are series connected and are connected between positive and negative sides VP, VN of DC voltage source. Second diodes 65, 66 are connected between the series connecting points of two switching devices 7, 61 and 8, 62 and neutral potential point VO, respectively. Reactor 6 is connected between the series connecting point of the first and second arms and neutral potential point VO. This construction is the same as the construction of the single phase of the main circuit of the NPC inverter, and this circuit is used as the first and second chopper circuits. Further, there are provided OFF-delay circuits 53, 54 which output switching signals G1A, G2A that become ON-commands immediately when switching signals G1, G2 are ON-commands and become OFF commands after a fixed time period when switching signals G1, G2 are OFF-commands, respectively. All others are the same as those shown in FIG. 1.

In the construction described above, if a deviation is generated between voltages Vp, Vn of capacitors 4, 5, voltage control signal Vc is output from voltage controller 46 and is input to computing unit 49 via output limiter 48. Computing unit 49 outputs either chopper control signal CH1 or CH2 according to the polarity of voltage control signal Vc and outputs either switching signal G1 or G2 via comparator 51 or 52, and thus, energy is directly moved from the higher voltage side to the lower voltage side of capacitors 4, 5 in the same way as shown in FIG. 1. Accordingly the neutral potential fluctuation is suppressed quickly by this chopper function.

For instance, when voltage Vp of capacitor 4 is higher than voltage Vn of capacitor 5 and the polarity of voltage control signal Vc is positive (Vc>0), computing unit 49 outputs voltage control signal Vc as chopper control signal CH1 and makes chopper control signal CH2 zero. As a result, comparator 51 compares chopper control signal CH1 with triangular wave signal TRS and outputs ON/OFF switching signal G1. As chopper control signal CH2 is zero, comparator 52 does not output switching signal G2. As OFF-delay circuit 53 outputs switching signal G1A immediately when switching signal G1 is ON, switching devices 7, 61 are turned ON simultaneously when switching signal G1 is ON. As a result, the voltage of capacitor 4 is applied to reactor 6 and current flows through reactor 6 and the energy of capacitor 4 is partially moved to reactor 6. When switching signal G1 is turned OFF, OFF-delay circuit 53 turns switching signal G1A OFF a fixed time later, and therefore, switching device 7 is turned OFF immediately but switching device 61 is turned OFF a fixed time later. Therefore, current of reactor 6 circulates and is stored through a closed circuit of reactor 6, diode 65 and switching device 61 during this fixed time period, and after the fixed time, switching device 61 is turned OFF. When switching device 61 is turned OFF, current in reactor 6 flows through capacitor 5 and diodes 10, 64 and energy of reactor 6 is moved to capacitor 5. Accordingly, the charge of capacitor 4 is partially moved to capacitor 5. As a result, voltage Vp of capacitor 4 drops, voltage Vn of capacitor 5 increases, and a voltage difference decreases.

Further, when voltage Vp of capacitor 4 is lower than voltage Vn of capacitor 5 and the polarity of voltage control signal Vc is negative (Vc<0), computing unit 49 reverses the polarity of voltage control signal Vc and outputs it as chopper control signal CH2 and makes chopper control signal CH1 zero. Then, comparator 52 compares chopper control signal CH2 with triangular wave signal TRS and outputs ON/OFF switching signal G2. As chopper control signal CH1 is zero, comparator 51 does not output switching signal G1. As OFF-delay circuit 54 outputs switching signal G2A immediately when switching signal G2 is ON, switching devices 8, 62 are turned ON simultaneously when switching signal G2 is ON. As a result, the voltage of capacitor 5 is applied to reactor 6 and current flows through reactor 6 and the energy of capacitor 5 is partially moved to reactor 6. When switching signal G2 is turned OFF, OFF-delay circuit 54 turns switching signal G2A OFF a fixed time later, and therefore, switching device 8 is immediately turned OFF but switching device 62 is turned OFF a fixed time later. Accordingly, current of reactor 6 circulates and is stored through the closed circuit of reactor 6, switching device 62 and diode 66 during this fixed time period, and when the fixed time passed, switching device 62 is turned OFF. When switching device 62 is turned OFF, current of reactor 6 flows through diodes 9, 63 and capacitor 4, and energy of reactor 6 is moved to capacitor 4. Accordingly, the charge of capacitor 5 is partially moved to capacitor 4. As a result, voltage Vn of capacitor 5 drops, voltage Vp of capacitor 4 increases, and a voltage difference decreases.

Further, a snubber circuit (not shown), composed of a parallel circuit of a diode and a resistor and a snubber capacitor connected in series with the parallel circuit, is connected to each of switching devices 7, 8, 61, 62. It is sufficient to set the fixed time period of OFF-delay circuits 53, 54 at a time period in which charging voltages of snubber capacitors connected to switching devices 7, 8 are almost recovered when these switching devices 7, 8 are turned OFF, respectively.

According to this embodiment, there is a mode to turn OFF the other switching device of one of the arms after voltage applied to one switching device which was turned OFF is fully recovered, while the one of the switching devices of the one arm is turned OFF and reactor current circulates and is stored in a closed loop. Accordingly, voltage applied to each switching device is restricted to positive side voltage Vp or negative side voltage Vn. Therefore, it is possible to use a switching device with a withstanding voltage that is a half of DC voltage (Vp-Vn), in this embodiment, so that, this embodiment is well applied to a high DC voltage system. Further, it is also possible to make energy to be moved in one cycle large by setting duty ratio of pulse width modulation at larger than 50%.

Figure 4:
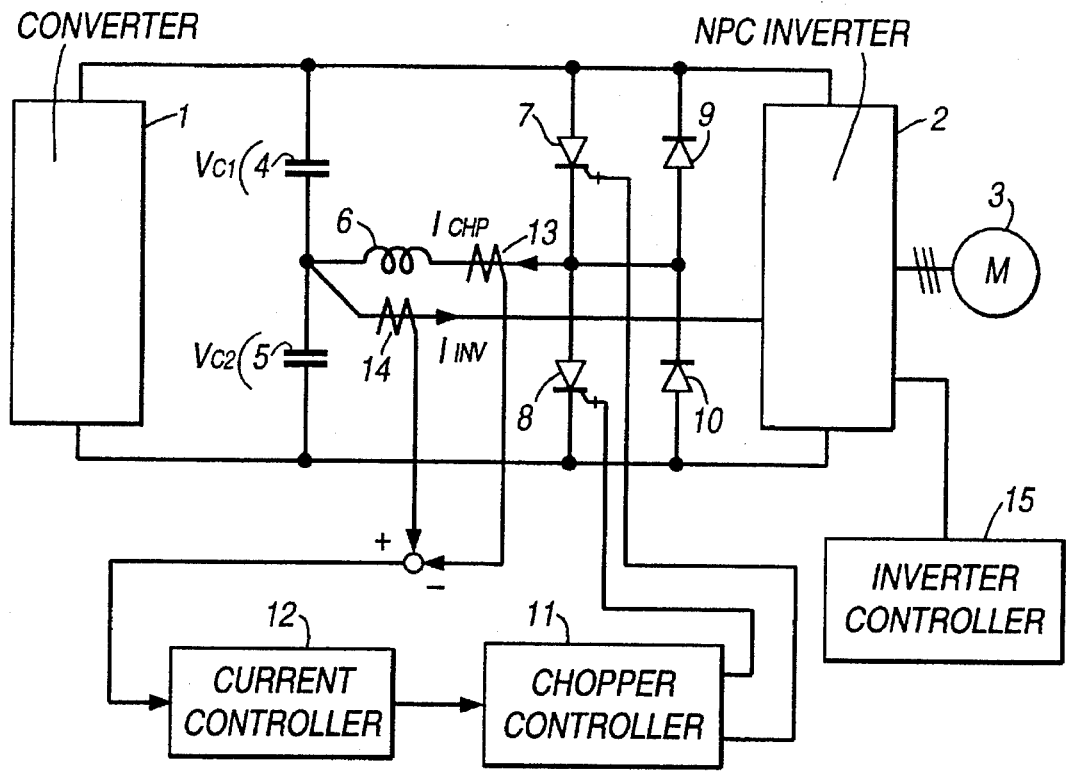
FIG. 4 is a system configuration diagram of a power converter according to a fourth embodiment of this invention.

FIG. 4 is a system configuration diagram of a power converter according to a fourth embodiment of this invention.

In FIG. 4, capacitors 4 and 5 are connected in series to the output side of two-level converter 1, and form a three-level DC voltage source to generate three level potentials; positive, neutral and negative potentials. Three-level NPC inverter 2 is connected as load to the output side of converter 1. Three-level NPC inverter 2 is controlled by an inverter controller 15 and drives AC motor 3. Two switching devices 7, 8 are connected in series between a positive potential bus and a negative potential bus of three-level DC voltage source, and two diodes 9, 10 are connected in antiparallel with switching devices 7, 8 respectively. A connecting point of two switching devices 7, 8 and a connecting point of two diodes 9, 10 are short-circuited and further, are connected to the neutral point of two DC capacitors 4, 5 via reactor 6. This circuit functions as step-up/step-down chopper circuits for two DC capacitors 4, 5. When DC capacitor 4 is used as an input capacitor and DC capacitor 5 is used as an output capacitor, a step-up/step-down chopper circuit is formed by switching device 7, reactor 6 and diode 10. Further, when DC capacitor 5 is used as an input capacitor and DC capacitor 4 is used as an output capacitor, a step-up/step-down chopper circuit is formed by switching device 8, reactor 6 and diode 9.

Now, the principle of operation of the chopper will he explained here. It is assumed that in FIG. 4, a chopper current I.CHP flowing through reactor 6 is in the direction of an arrow, which is referred to as positive. When switching device 7 is ON and switching device 8 is OFF, current flows through capacitor 4, switching device 7 and reactor 6. During this period, chopper current I.CHP flowing through reactor 6 increases. That is, this indicates that energy of capacitor 4 is moved to reactor 6 and voltage of capacitor 4 decreases. When switching device 7 is OFF and switching device 8 is ON, current flows through capacitor 5, diode 10 and reactor 6. During this period, chopper current I.CHP flowing through reactor 6 decreases. That is, this indicates that energy of reactor 6 is moved to capacitor 5 and voltage of capacitor 5 increases. This is the chopper operation when chopper current I.CHP is positive. When chopper current I.CHP is negative, it can also be considered to be similar, so that the detailed description is omitted. The construction of the main circuit is as explained above.

The chopper controller is in such the construction as shown below. There is provided a current detector 13 to detect chopper current I.CHP flowing through chopper reactor 6. Further, there is provided a current detector 14 to detect an inverter neutral current I.INV flowing to the neutral point of NPC inverter 2 from the neutral potential point of the DC power source. Detected chopper current I.CHP is subtracted from detected inverter neutral current I.INV, and the deviation is input to a current controller 12. This current controller 12 is provided to control the input, the deviation of two currents I.CHP, I.INV, to zero, and is composed of, for instance, a proportional integrating compensator, etc. The output of current controller 12 is input to a chopper controller 11, which changes its chopper duty by the triangular wave comparison PWM method and controls a mean voltage at the connecting point of two switching devices 7, 8.

Figure 4A:
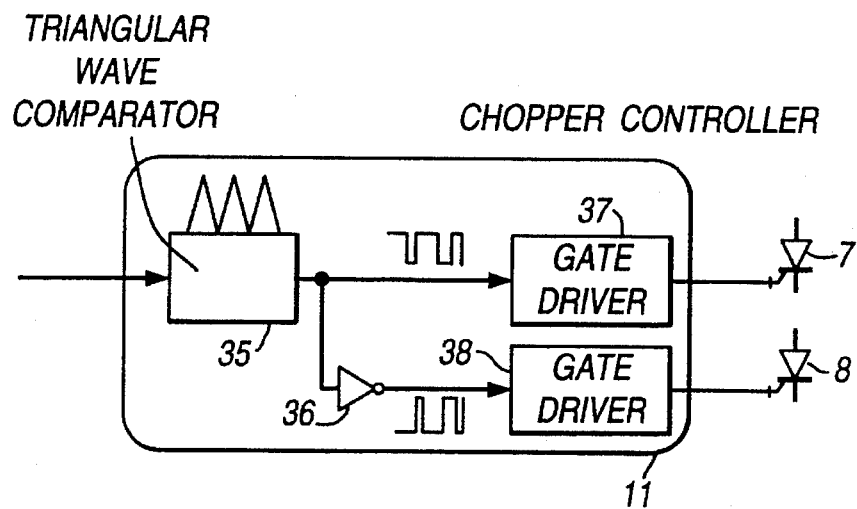
FIG. 4A is a system configuration diagram of the chopper controller in the power converter shown in FIG. 4.

One example of the construction of chopper controller 11 is shown in FIG. 4A. The input to chopper controller 11, which is the output of current controller 12, is input to a triangular wave comparator 35 and a triangular wave PWM wave is output therefrom. The output of triangular wave comparator 35 is input to a gate driver 37 and becomes a gate signal for switching device 7. Further, the output of triangular wave comparator 35 is also input to an inverter 36 and is inverted therein. The output of inverter 36 is input to a gate driver 38 and becomes a gate signal for switching device 8. So, when switching device 7 is in the ON state, switching device 8 is in the OFF state, and when switching device 7 is in the OFF state, switching device 8 is in the OFF state. Therefore, if either one of switching devices 7, 8 is ON, the other is in the OFF state, so that DC short-circuit is never taken place in the series circuit of switching devices 7, 8.

According to the fourth embodiment in the construction as described above, such actions and effects as shown below are obtained. The neutral potential fluctuation wherein voltages of two DC capacitors 4, 5 do not agree with each other is caused by current flowing in/out of the neutral point which is the connecting point of two DC capacitors 4, 5. In the circuit shown in FIG. 4, chopper current I.CHP flows in the neutral point and inverter neutral current I.INV flows out therefrom. Therefore, if the power converter is so controlled as to make the current deviation to zero which is obtained by subtracting detected chopper current I.CHP from detected inverter neutral current I.INV, current flowing to DC capacitors 4, 5 from the neutral point becomes small. As a result, it becomes possible to make the neutral potential fluctuation small. In the case that chopper current I.CHP and inverter neutral current I.INV flow in the opposite directions to the arrows in FIG. 4 respectively, the same actions and effects can be obtained.

Hereinafter, the simulation results of the operation of the power converter shown in FIG. 4 will be described.

First, this power converter is designed for driving a main machine for a steel mill of 5,000 KW.

The capacitances of capacitors 4, 5 are 10 mF, the inductance of reactor 6 is 0.5 mH, and voltage references V-C1* and V-C2* of voltages V-C1 and V-C2 of capacitors 4 and 5 are 3,000 volts (initial values). The switching frequency of the chopper circuit is 512 Hz and inverter neutral current I.INV is 2,000×sin (2π.Finv.t) amperes, where Finv is a frequency of NPC inverter 2.

The simulation results are shown in FIGS. 5A, 5B, 5C and 5D.

Figure 5A:
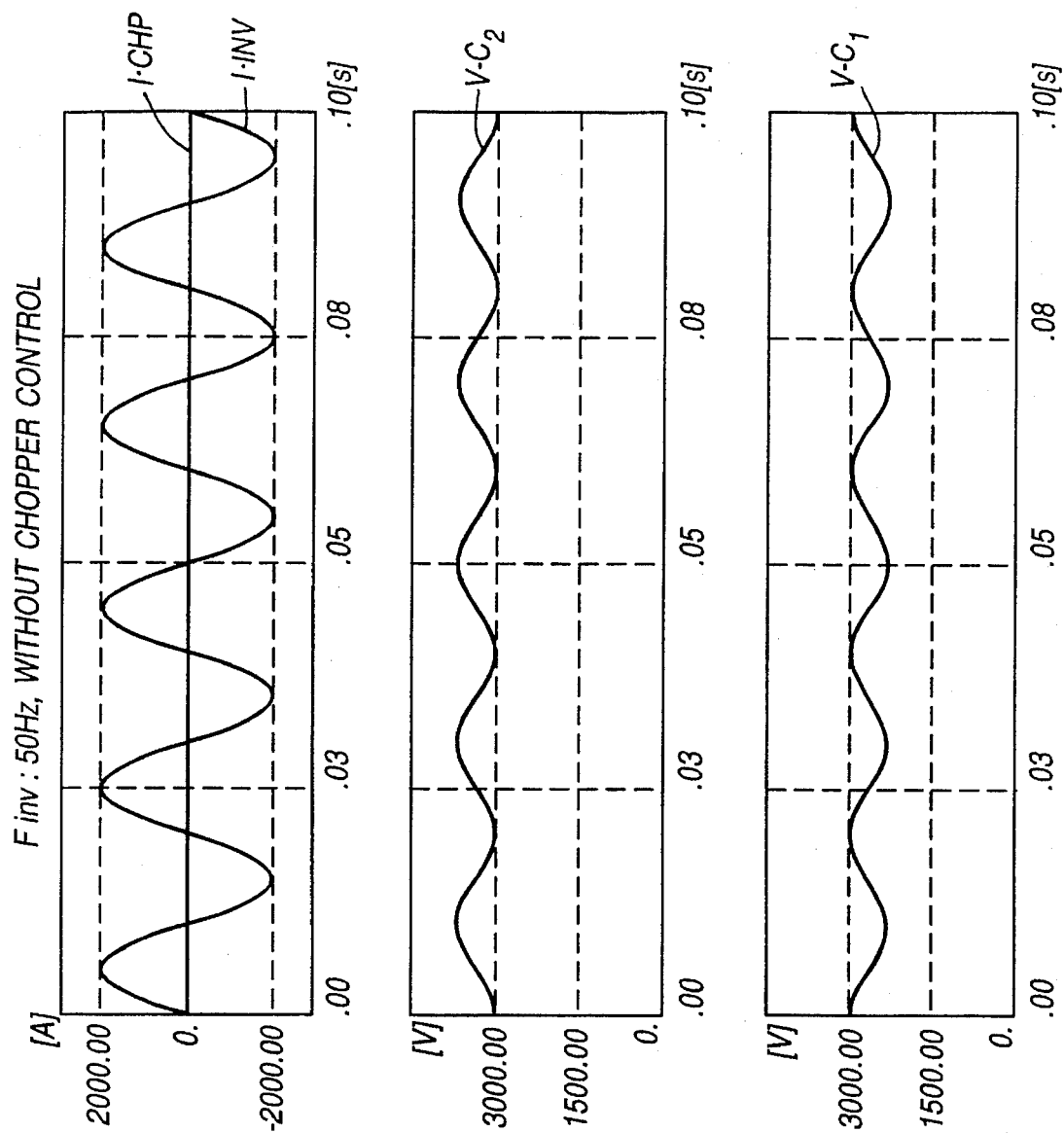
FIG. 5A is a waveform chart showing a simulation result of the operation of the power converter shown in FIG. 4.
Figure 5B:
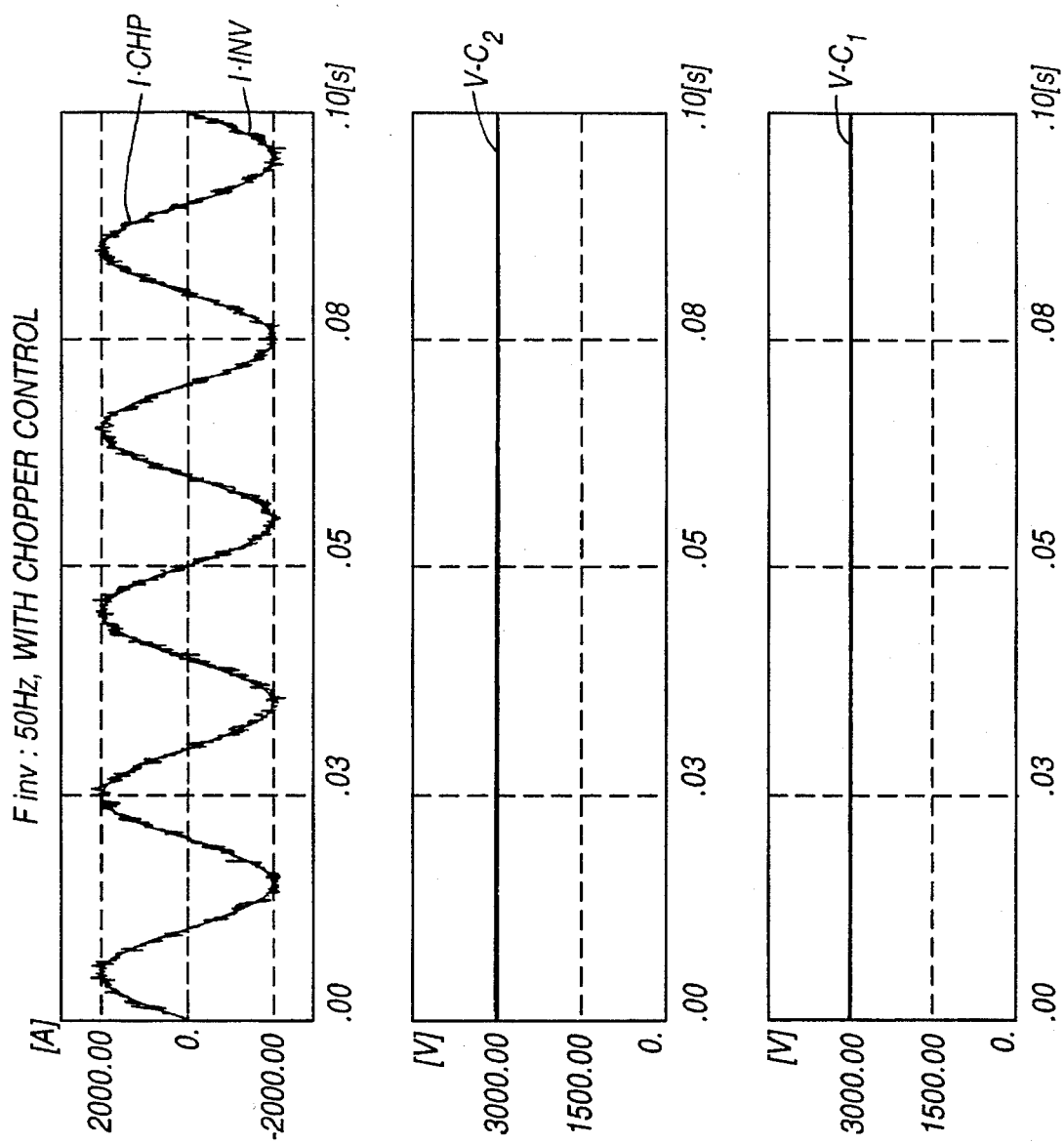
FIG. 5B is a waveform chart showing a simulation result of the operation of the power converter shown FIG. 4.

FIGS. 5A and 5B respectively show the cases where inverter frequency Finv is 50 Hz without chopper control and with chopper control. In FIG. 5A, it is found that chopper current I.CHP is zero and voltages V-C1 and V-C2 fluctuate. This means that the neutral potential of three-level DC voltage source fluctuates. In FIG. 5B, it is found that chopper current I.CHP flows following inverter neutral current I.INV and voltages V-C1 and V-C2 do not fluctuate. This means that the fluctuation of the neutral potential of the three-level DC voltage source is well suppressed.

Figure 5C:
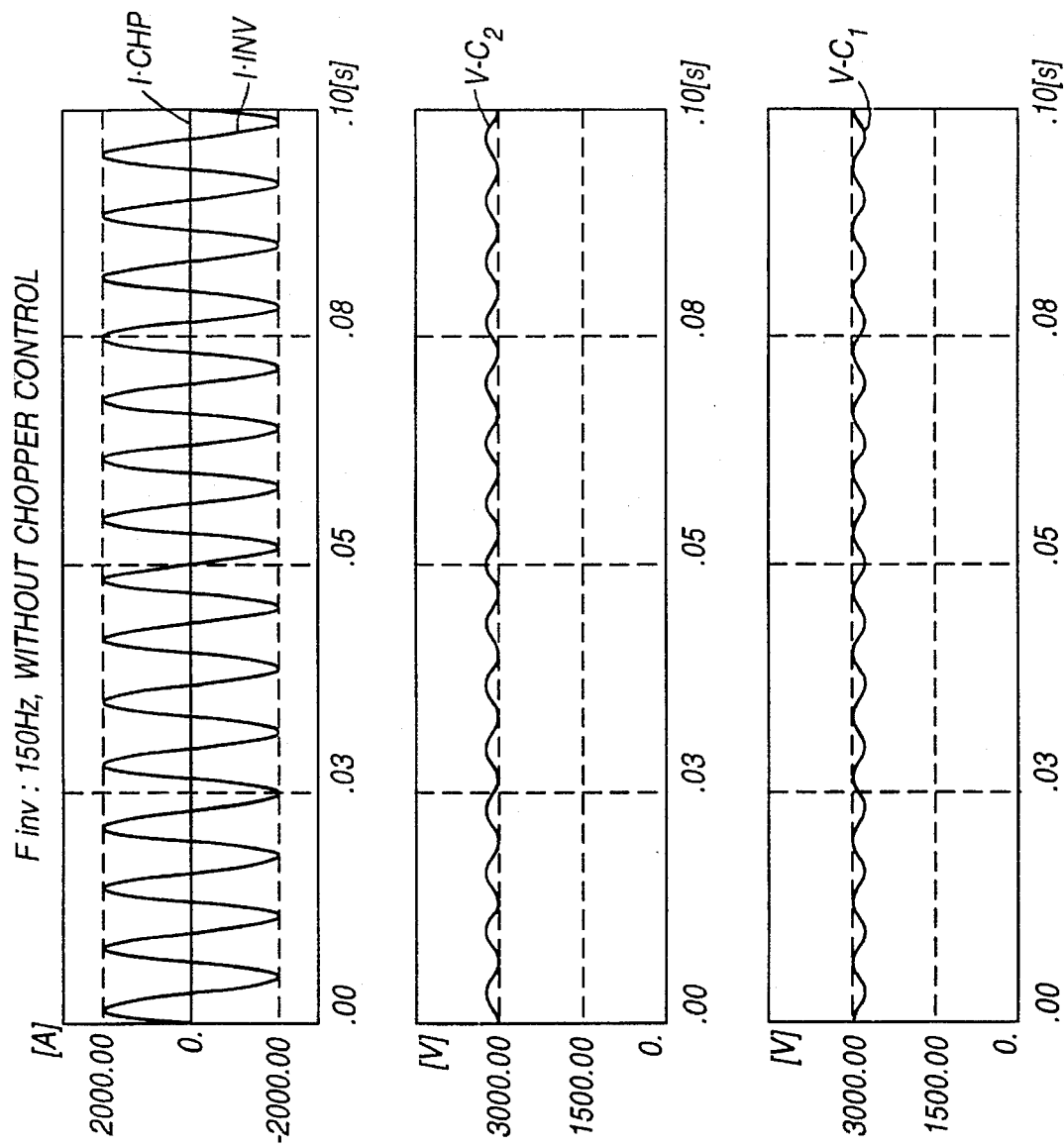
FIG. 5C is a waveform chart showing a simulation result of the operation of the power converter shown in FIG. 4.
Figure 5D:
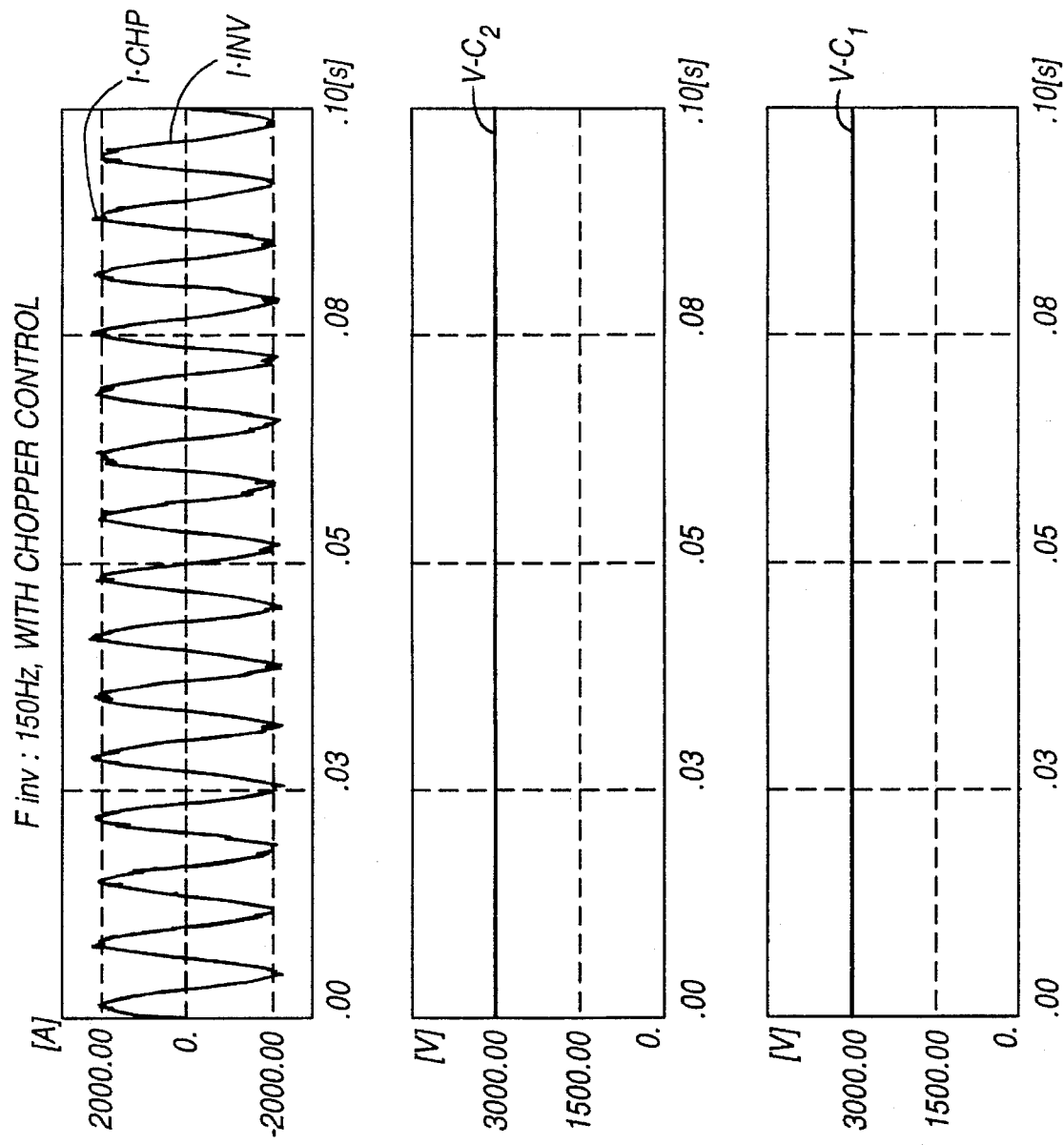
FIG. 5D is a waveform chart showing a simulation result of the operation of the power converter shown in FIG. 4.

FIGS. 5C and 5D respectively show the cases where inverter frequency Finv is 150 Hz without chopper control and with chopper control. From these FIGUREs, it is also clear that the fluctuation of the neutral potential of the three-level DC voltage source is well suppressed, in the case shown in FIG. 5D with chopper control.

In addition, by constructing the power converter as described above, it is possible to improve a voltage utilization factor of a converter and an inverter in the power converter, and it is also possible to achieve the downsizing or low pricing of the power converter.

Figure 6:
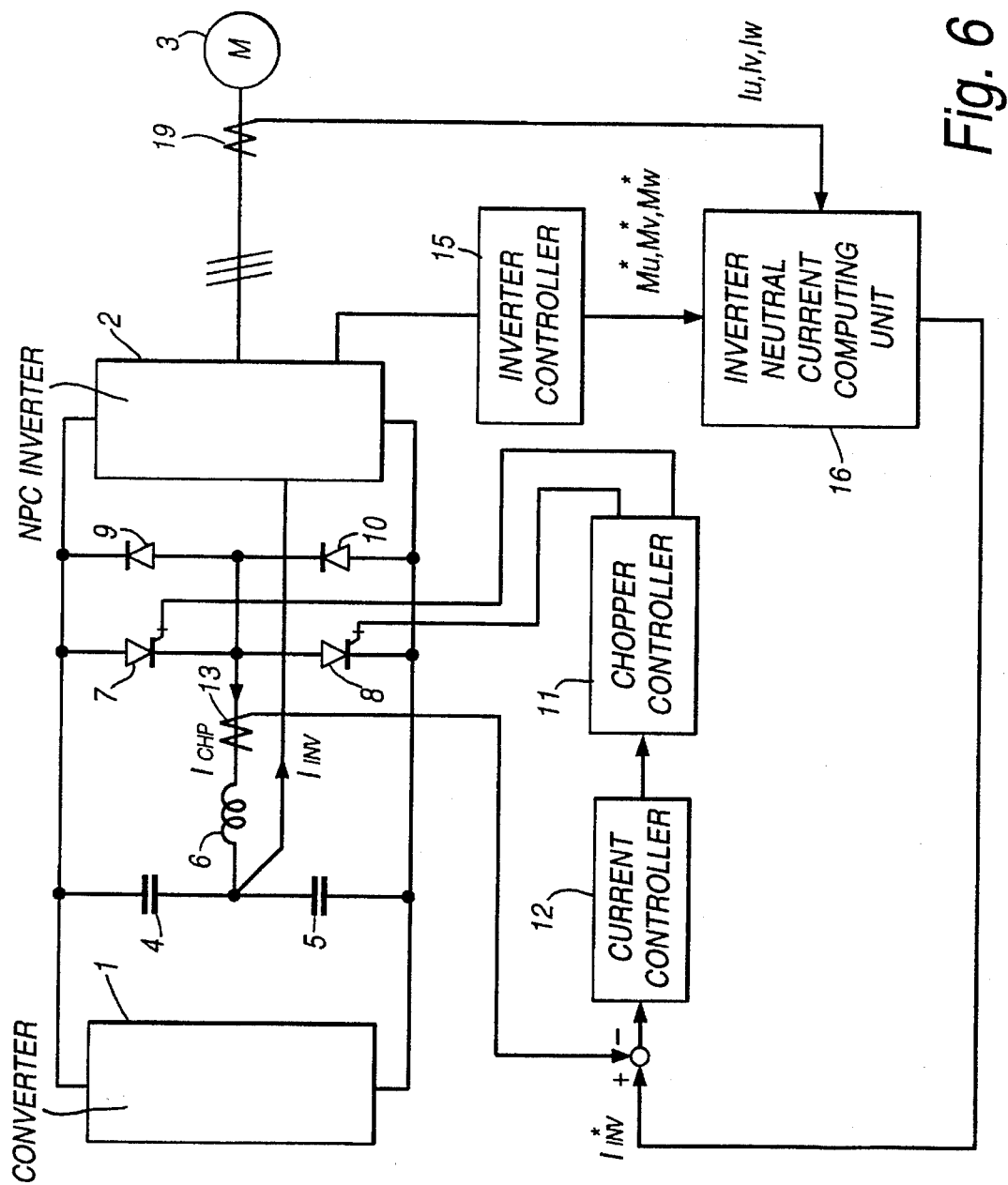
FIG. 6 is a system configuration diagram of a power converter according to a fifth embodiment of this invention.

FIG. 6 is a system configuration diagram of a power converter according to a fifth embodiment of this invention. In the construction shown in FIG. 6, the main circuit portion is the same as the fourth embodiment shown in FIG. 4, and therefore, a chopper controller only will be described here. This chopper controller is in such the construction as described below.

Voltage modulation factors of three phases of three-level NPC inverter 2; MU*, MV*, MW* are input to an inverter neutral current computing unit 16 from inverter control unit 15 which controls three-level NPC inverter 2. There is provided a current detector 19 to detect three phase currents IU, IV and IW flowing from NPC inverter 2 to motor 3. Detected three phase currents IU, IV and IW are input to inverter neutral current computing unit 16. An inverter neutral current I.INV is computed, for instance according to the following formula by inverter neutral current computing unit 16. This is according to the literature ("Suppression Processing of AC Fluctuation of Neutral Voltage of Three-Level Inverter", No. 91 disclosed at National Meeting of D-Department of the Institute of Electrical Engineers of Japan).

$$I.INV^{*}=-|MU^{*}|.IU-|MV^{*}|.IV-|MW^{*}|.IW \qquad (1)$$

There is provided current detector 13 to detect chopper current I.CHP flowing through chopper reactor 6. Detected chopper current I.CHP is subtracted from computed inverter neutral current I.INV and the deviation is input to current controller 12. Current controller 12 is provided to control the input to zero, and is composed of, for instance, a proportional integrating compensator and the like. The output of current controller 12 is input to chopper controller 11, which changes its chopper duty by the triangular wave comparing PWM method and controls a mean voltage at the connecting point of two switching devices 7, 8.

According to the fifth embodiment in the construction as described above, actions and effects described below are obtained.

The neutral potential fluctuation wherein voltages of two DC capacitors 4, 5 do not agree with each other is caused by current flowing in/out of the neutral point which is the connecting point of two DC capacitors 4, 5. In the circuit shown in FIG. 6, chopper current I.CHP flows in the neutral point and inverter neutral current I.INV flows out therefrom. Accordingly, if the power converter is so controlled that detected chopper current I.CHP is subtracted from inverter neutral current I.INV* computed from voltage modulation factors MU*, MV*, MW* and detected three-phase currents IU, IV, IW and the current difference is controlled to zero, current flowing to DC capacitors 4, 5 from the neutral point becomes small. As a result, it is possible to make the neutral potential fluctuation small.

When a power converter is constructed as described above, it is possible to improve a voltage utilization factor of a converter and an inverter in the power converter, and it is also possible to achieve the downsizing or low pricing of the power converter.

Figure 7:
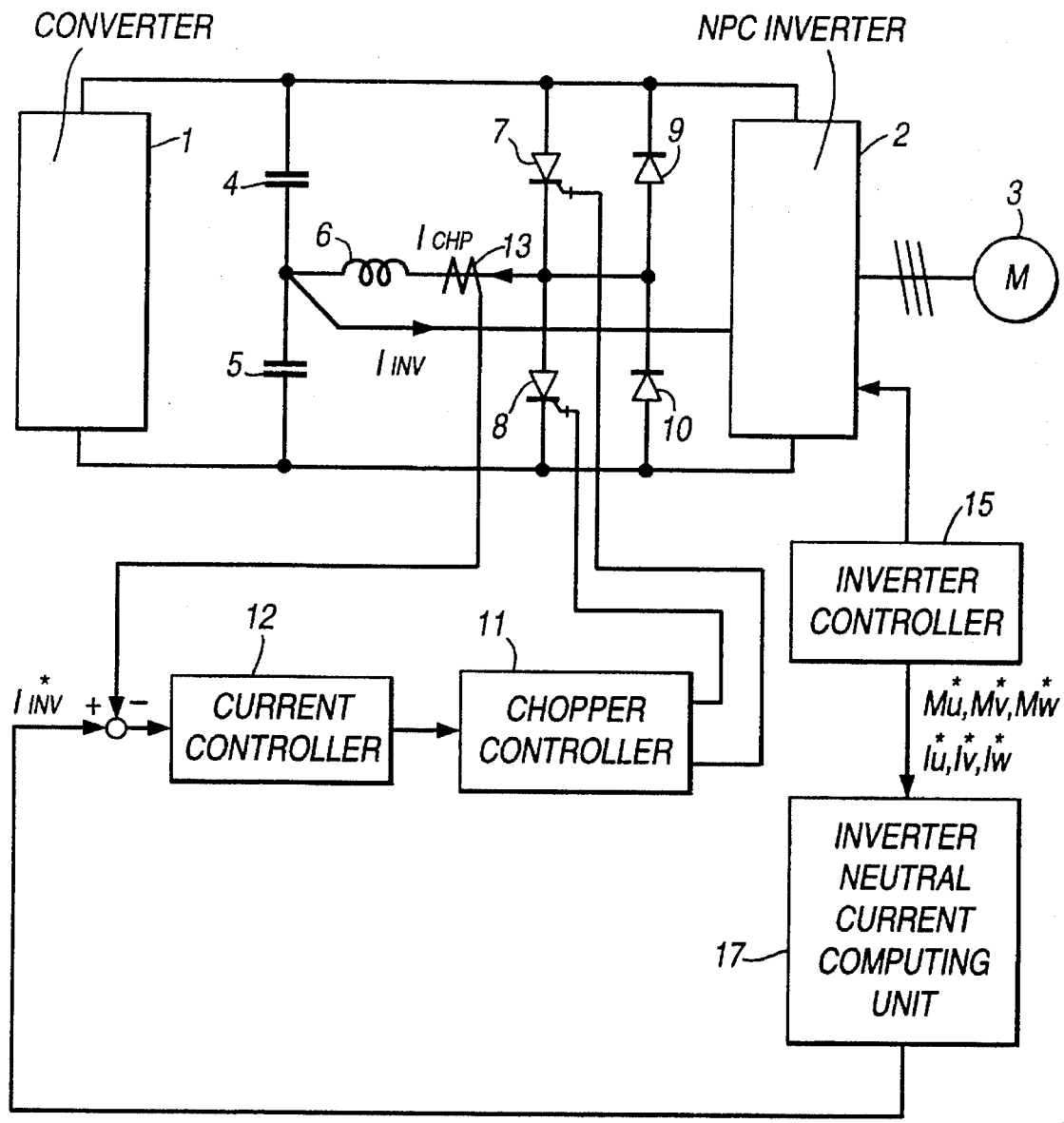
FIG. 7 is a system configuration diagram of a power converter according to a sixth embodiment of this invention.

FIG. 7 is a system configuration diagram of a power converter according to a sixth embodiment of this invention.

In the construction shown in FIG. 7, the main circuit portion is the same as the fourth embodiment shown in FIG. 4, and therefore, the chopper controller only will be explained here. The chopper controller is in the construction shown below.

Voltage modulation factors of three phases of three-level NPC inverter 2; MU*, MV* and MW* and three phase current references IU*, IV* and IW* are input to an inverter neutral current computing unit 17 from inverter controller 15 which controls three-level NPC inverter 2. Inverter neutral current I.INV* is computed by inverter neutral current computing unit 17 according to, for instance, the following formula. This is according to the literature ("Suppression Processing of AC Fluctuation of Neutral Voltage of Three-Level Inverter", No. 91 disclosed at National Meeting of D-Department of the Institute of Electrical Engineers of Japan).

$$I.INV^{*}=-|MU^{*}|.IU^{*}-|MV^{*}|.IV^{*}-|MW^{*}|.IW^{*} \qquad (2)$$

There is provided current detector 13 to detect chopper current I.CHP flowing through chopper reactor 6. Detected chopper current I.CHP is subtracted from computed inverter neutral current I.INV and the deviation is input to current controller 12. Current controller 12 is provided to control the input to zero, and is composed of, for instance, a proportional integrating compensator and the like. The output of current controller 12 is input to chopper controller 11, which changes its chopper duty by the triangular wave comparing PWM method, and controls a mean voltage at the connecting point of two switching devices 7, 8.

According to the sixth embodiment in the construction described above, actions and effects described below are obtained.

The neutral potential fluctuation wherein voltages of two DC capacitors 4, 5 do not agree with each other is caused by current flowing in/out of the neutral point which is the connecting point of two DC capacitors 4, 5. In the circuit shown in FIG. 7, chopper current I.CHP flows in the neutral point and inverter neutral current I.INV flows out therefrom. Accordingly, if the power converter is so controlled that detected chopper current I.CHP is subtracted from inverter neutral current I.INV* computed from voltage modulation factors MU*, MV*, MW* and three-phase current references IU*, IV*, IW* and the current difference is controlled to zero, current flowing to DC capacitors 4, 5 from the neutral point becomes small. As a result, it is possible to make neutral potential fluctuation small. Further, as inverter neutral current I.INV* is obtained by computation in inverter neutral current computing unit 17 and chopper current I.CHP is forced to flow following computed inverter neutral current I.INV*, the faster response of chopper current I.CHP is possible than that of the construction shown in FIG. 6 by the time corresponding to the delay time needed for detecting currents IU, IV, IW in current detector 19. As a result, the neutral potential fluctuation can be made smaller.

When a power converter is constructed as described above, it is possible to improve a voltage utilization factor of a converter and an inverter in the power converter and it is also possible to achieve the downsizing or low pricing of the power converter.

Figure 8:
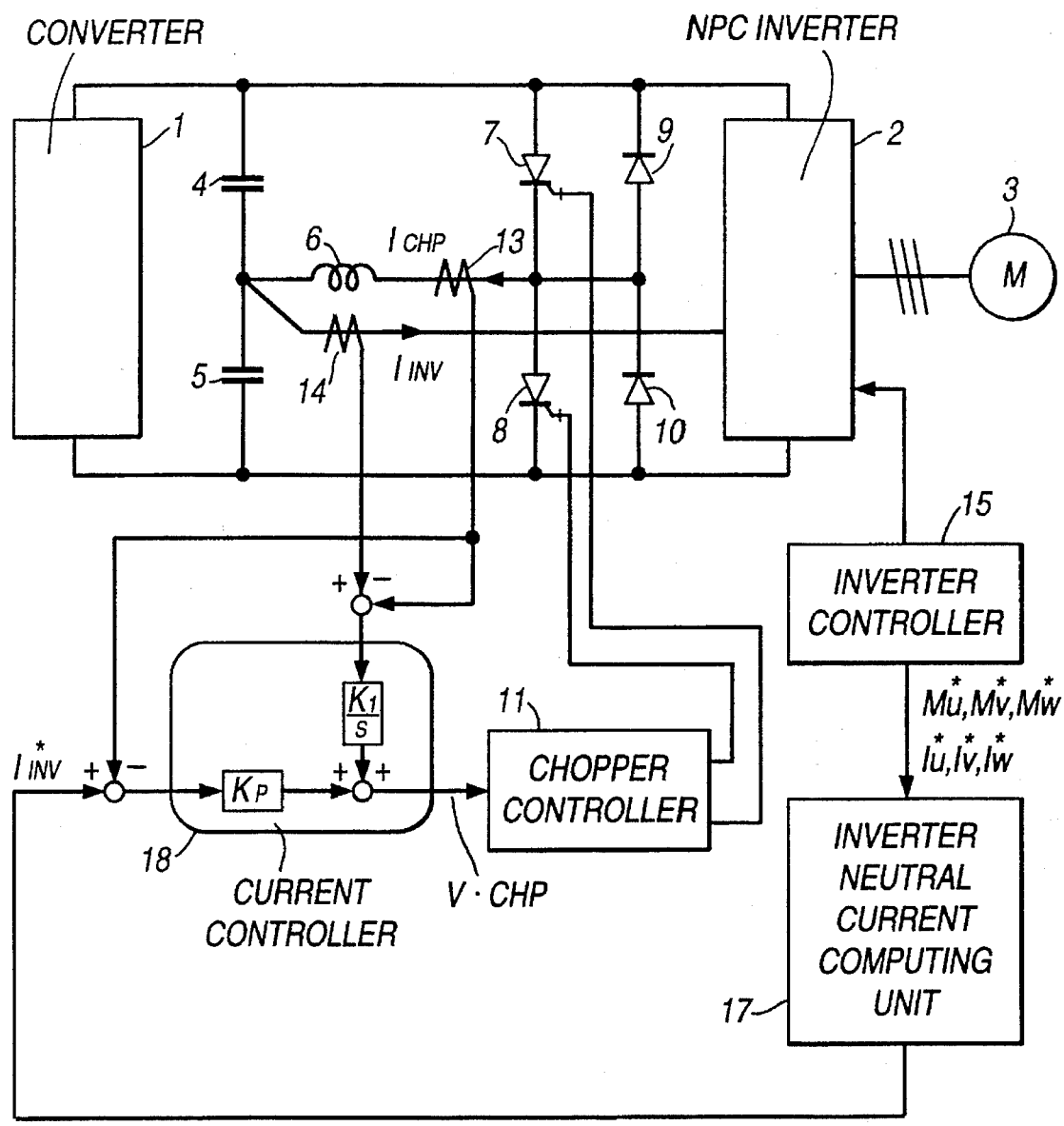
FIG. 8 is a system configuration diagram of a power converter according to a seventh embodiment of this invention.

FIG. 8 is a system configuration diagram of a power converter according to a seventh embodiment of this invention.

In the construction shown in FIG. 8, the main circuit portion is the same as the fourth embodiment shown in FIG. 4, and therefore, the chopper controller only will be described here. The copper controller is in the construction as shown below.

Voltage modulation factors of three phases of three-level NPC inverter 2; MU*, MV* and MW* and three phase current references IU*, IV* and IW* are input to inverter neutral current computing unit 17 from inverter controller 15 which controls three-level NPC inverter 2. Inverter neutral current I.INV* is computed by inverter neutral current computing unit 17 as described before. There is provided current detector 13 to detect chopper current I.CHP flowing through chopper reactor 6, and there is also provided current detector 14 to detect inverter neutral current I.INV. Detected chopper current I.CHP is subtracted from computed inverter neutral current I.INV* and the deviation is input to a current controller 18. Detected chopper current I.CHP is also subtracted from detected inverter neutral current I.INV and the deviation is also input to current controller 18. In current controller 18, the computation is performed according to the following formula.

$$V.CHP=KP.(I.INV^{*}-I.CHP)+KI.\int(I.INV-I.CHP)dt \qquad (3)$$

where, KP is a proportional gain, KI is an integrated gain, and V.CHP is an output of current controller 18. Output V.CHP of current controller 18 is input to chopper controller 11, which changes its chopper duty by the triangular wave comparing PWM method, and controls a mean voltage at the connecting point of two switching devices 7, 8.

According to the seventh embodiment in the construction described above, actions and effects shown below are obtained.

The neutral potential fluctuation wherein voltages of two DC capacitors do not agree with each other is caused by current flowing in/out of the neutral point which is the connecting point of two DC capacitors 4, 5. In the circuit shown in FIG. 8, chopper current I.CHP flows in the neutral point and inverter neutral current I.INV flows out therefrom. Accordingly, if the power converter is so controlled that chopper current I.CHP is subtracted from inverter neutral current I.INV and the deviation is controlled to zero, current flowing to DC capacitors 4, 5 from the neutral point becomes small. As a result, it is possible to make the neutral potential fluctuation small. Here, when chopper current I.CHP is controlled as shown by the formula (3), chopper current I.CHP follows computed inverter neutral current I.INV* transiently and a small compensation without delay is possible. Further, the deviation between detected inverter neutral current I.INV and chopper current I.CHP is stationarily controlled to zero as there exists an integrator. Therefore, it is possible to make a satisfactory compensation transiently as well as stationarily, and the neutral potential fluctuation can be made smaller.

When a power converter is constructed as described above, it is possible to improve a voltage utilization factor of a converter and an inverter in the power converter, and it is also possible to achieve the downsizing or low pricing of the power converter.

Figure 9:
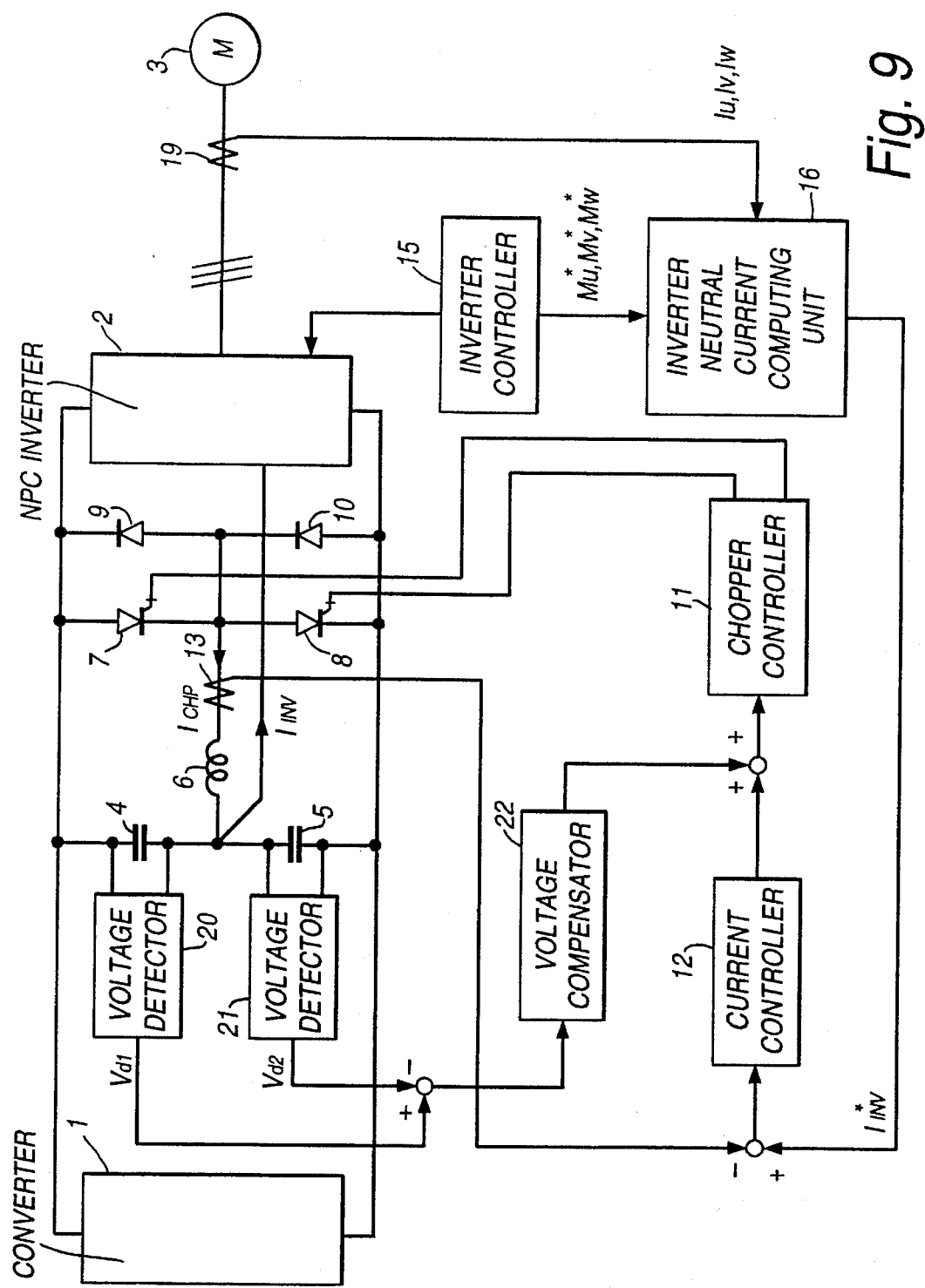
FIG. 9 is a system configuration diagram of a power converter according to an eighth embodiment of this invention.

FIG. 9 is a system configuration diagram of a power converter according to an eighth embodiment of this invention.

The construction shown in FIG. 9 is based on the construction shown in FIG. 6, and therefore, differences between FIGS. 6 and 9 only will be described here.

Two voltage detectors 20, 21 are provided to detect voltages Vd1, Vd2 of two DC capacitors 4, 5, respectively. A voltage difference between detected voltages Vd1, Vd2 of two capacitors 4, 5 is input to a voltage compensator 22. The voltage compensator 22 acts to make this difference of two detected voltages Vd1, Vd2 zero. The output of voltage compensator 22 is added to the output of current controller 12 and the sum is input to chopper controller 11.

According to the eighth embodiment in the construction described above, actions and effects described below are obtained. That is, the same actions and effects as those of the fifth embodiment shown in FIG. 6 are obtained. Further, if a DC error is generated due to DC drift of current detector 13 and the like, DC fluctuation of neutral potential can be suppressed by detecting voltages Vd1, Vd2 of two capacitors 4, 5, computing a voltage difference and controlling it to zero.

When a power converter is constructed as described above, it is possible to improve a voltage utilization factor of a converter and an inverter in the power converter, and it is also possible to achieve the downsizing or low pricing of the power converter.

The construction described above is based on the fifth embodiment shown in FIG. 6, but the similar actions and effects are obtained when the above-described construction in applied to the fourth, sixth and seventh embodiments shown in FIGS. 4, 7 and 8, respectively.

Figure 10:
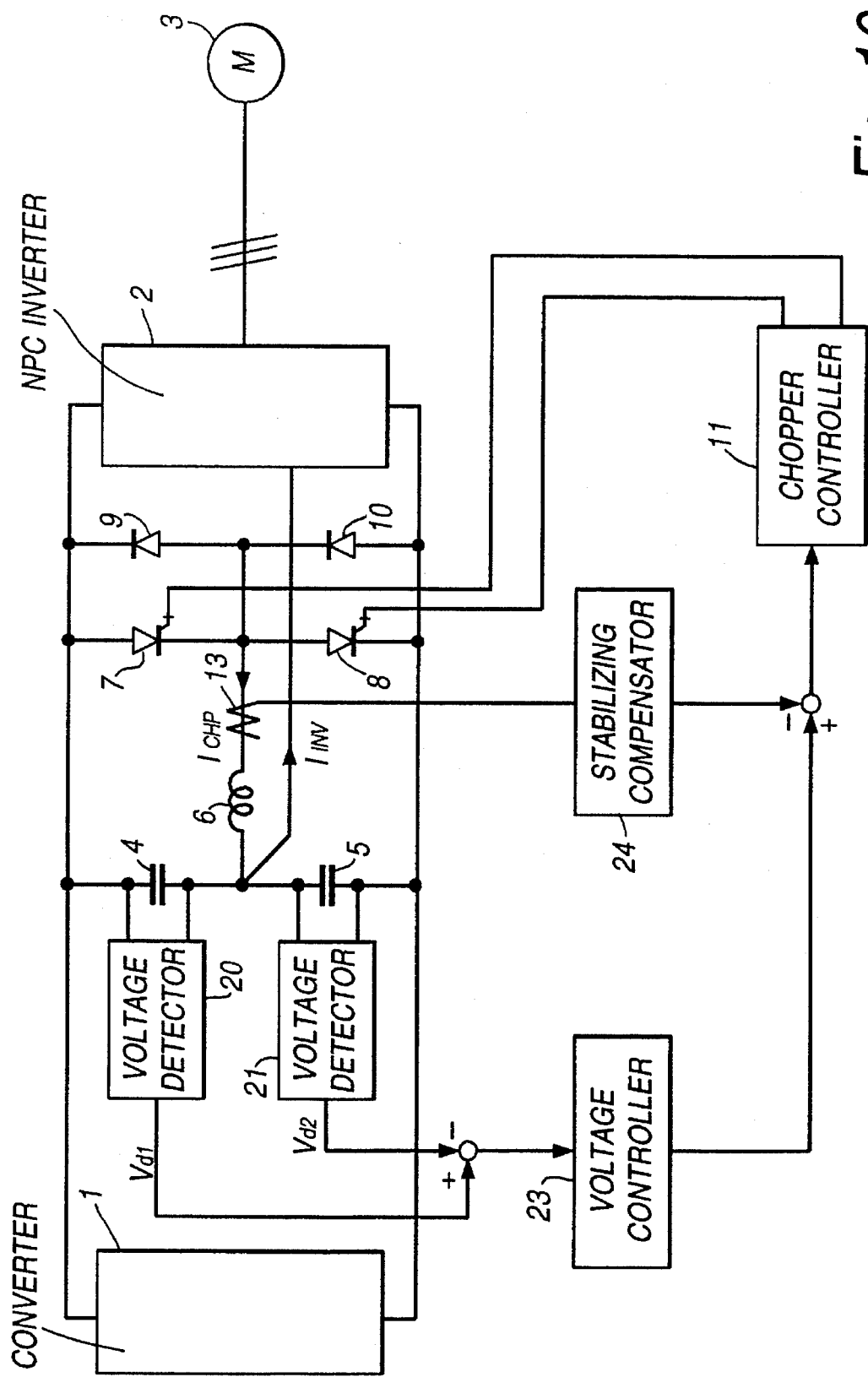
FIG. 10 is a system configuration diagram of a power converter according to a ninth embodiment of this invention.

FIG. 10 is a system configuration diagram of a power converter according to a ninth embodiment of this invention.

In the construction shown in FIG. 10, the main circuit portion is the same as that in the fourth embodiment shown in FIG. 4 and therefore, the chopper controller only will be described here. The chopper controller is in the construction shown below.

Two voltage detectors 20, 21 are provided to detect voltages Vd1, Vd2 of two DC capacitors 4, 5, respectively.

A difference between detected voltages Vd1, Vd2 of two capacitors 4, 5 is input to a voltage controller 23. Voltage controller 23 is provided to control the input, that is the difference between detected voltage Vd1, Vd2, to make it zero, and is composed of, for instance, a proportional compensator, a proportional integrating compensator and the like. Current controller 13 is provided to detect chopper current I.CHP flowing through reactor 6. Detected chopper current I.CHP is input to a stabilizing compensator 24 composed of, a proportional compensator with a proportional gain K. The output of stabilizing compensator 24 is subtracted from the output of voltage controller 23 and the difference is input to chopper controller 11, which changes chopper duty by the triangular wave comparing PWM method, and controls a mean voltage at the connecting point of two switching devices 7, 8.

According to the ninth embodiment in the construction described above, actions and effects described below are obtained. That is, by detecting voltages Vd1, Vd2 of two DC capacitors 4, 5 and controlling the chopper to make the difference of these two voltages Vd1, Vd2 zero, the neutral potential fluctuation can be suppressed. However, even when voltages only are controlled, there is still some fear for LC resonance between the chopper reactor 6 and DC capacitors 4, 5. Therefore, the neutral potential is stabilized by adding a compensation by detected chopper current I.CHP.

When a power converter is constructed as described above, it becomes possible to improve a voltage utilization factor of a converter and an inverter in the power converter, and it is also possible to achieve the downsizing or low pricing of the power converter.

Figure 11:
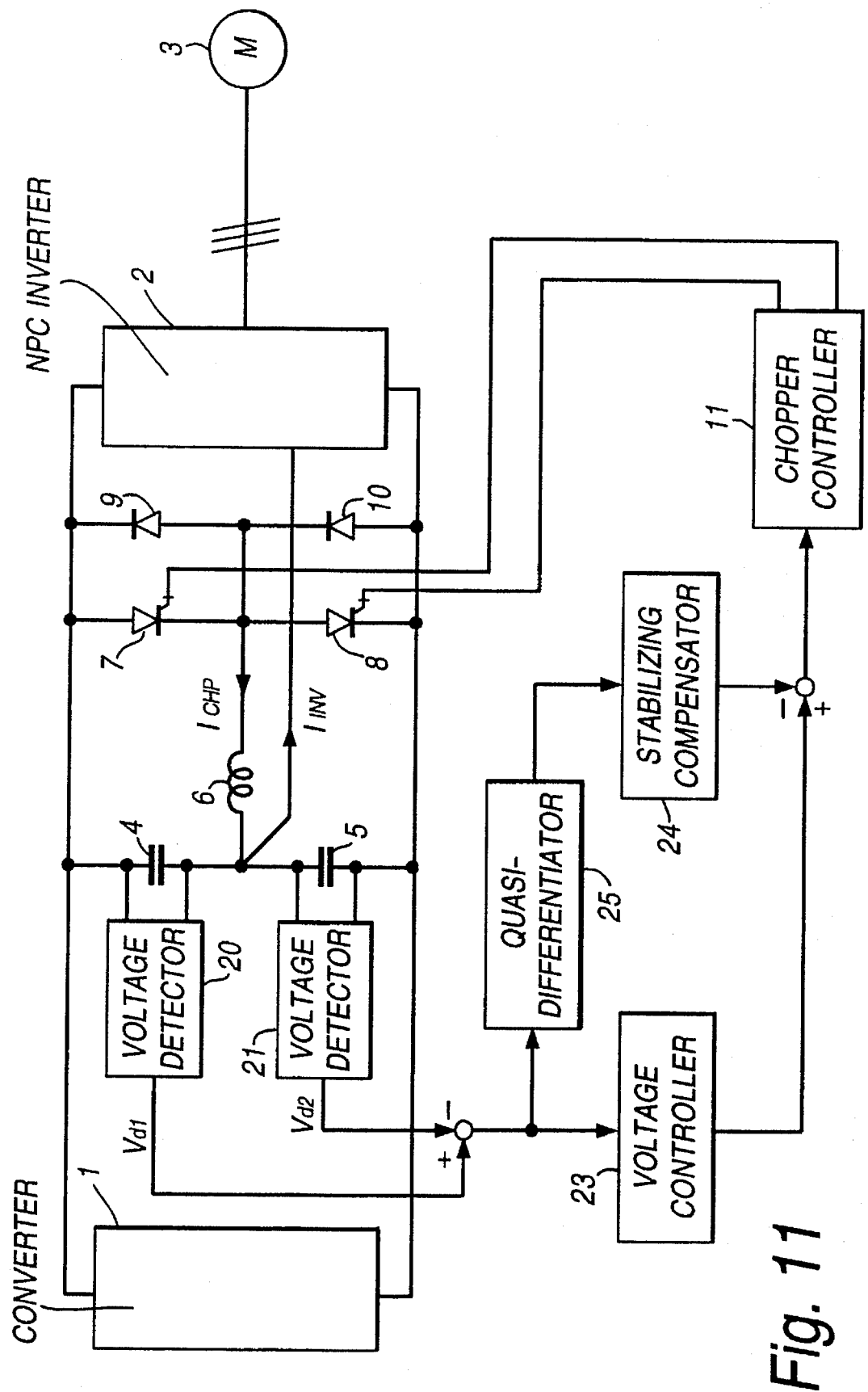
FIG. 11 is a system configuration diagram of a power converter according to a tenth embodiment of this invention.

FIG. 11 is a system configuration diagram of a power converter according to a tenth embodiment of this invention.

In the construction shown in FIG. 11, the main circuit portion is the same as the fourth embodiment shown in FIG. 4, and therefore, the chopper controller only will be described here. The chopper controller is in the construction shown below.

Two voltage detectors 20, 21 are provided to detect voltages Vd1, Vd2 of two DC capacitors 4, 5, respectively. A difference between detected voltages Vd1, Vd2 of two capacitors 4, 5 is input to voltage controller 23. Voltage controller 23 is provided to control the input to make it zero, and is composed of, for instance, a proportional compensator, a proportional integrating compensator and the like. The difference between the detected voltages Vd1, Vd2 of two capacitors 4, 5 is also input to a quasi-differentiator 25, where the quasi-differential computation of the input voltage difference is carried out. The output of quasi-differentiator 25 is input to stabilizing compensator 24. The output of stabilizing compensator 24 is subtracted from the output of voltage controller 23 and the difference is input to chopper controller 11, which changes chopper duty by the triangular wave comparing PWM method and controls a mean voltage at the connecting point of two switching devices 7, 8.

According to the tenth embodiment in the construction described above, actions and effects shown below are obtained. That is, by detecting voltages Vd1, Vd2 of two DC capacitors 4, 5 and controlling the copper to make the difference of these two voltages Vd1, Vd2 zero, it is possible to suppress the neutral potential fluctuation. However, even when voltages only are controlled, there is still some fear for LC resonance between chopper reactor 6 and DC capacitors 4, 5. Therefore, the neutral potential is stabilized by adding a compensation by a quasi-differential value of the difference between detected voltages Vd1, Vd2 of capacitors 4, 5.

When a power converter is constructed as described above, it becomes possible to improve a voltage utilization factor of a converter and an inverter in the power converter, and it is also possible to achieve the downsizing or low pricing of the power converter.

Figure 12:
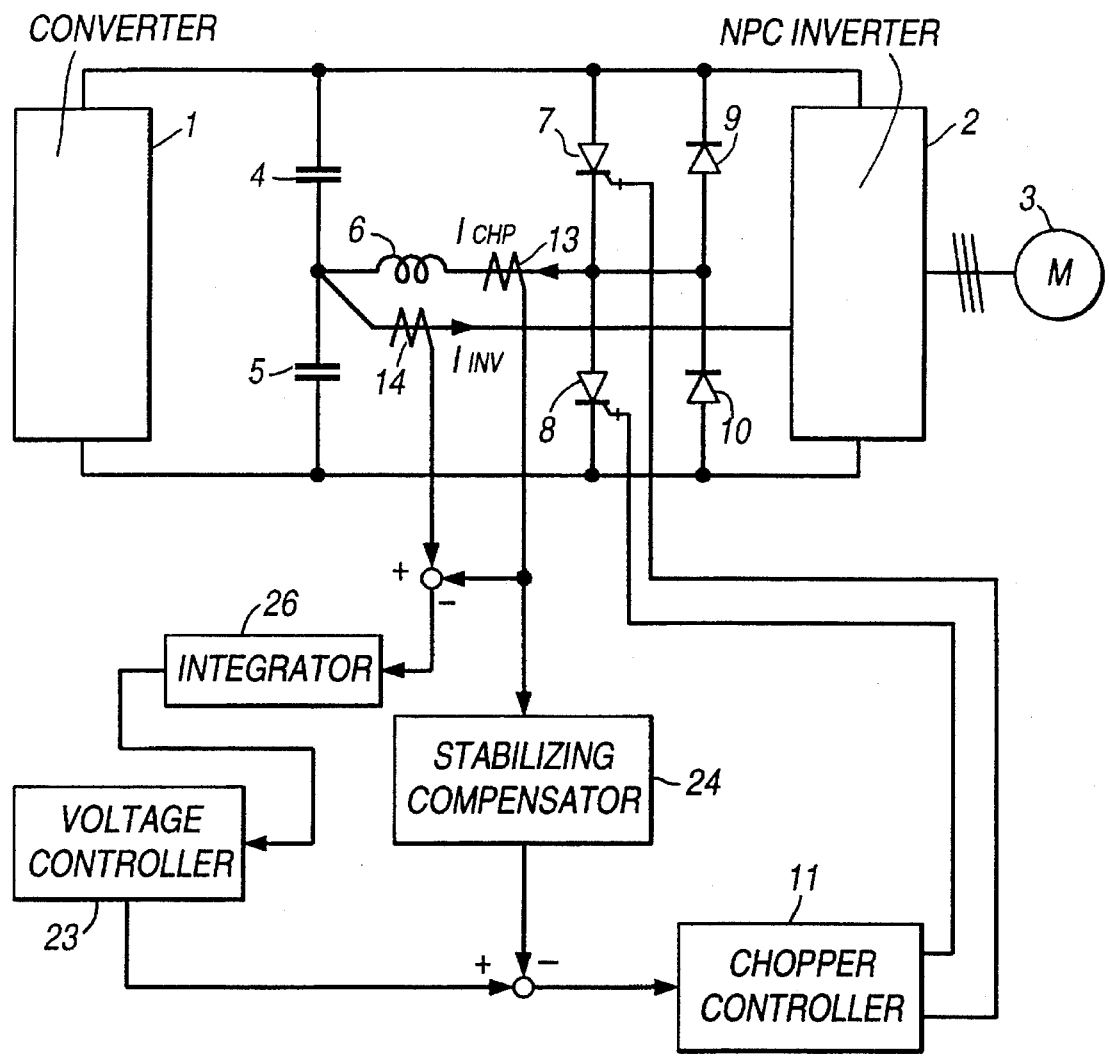
FIG. 12 is a system configuration diagram of a power converter according to an eleventh embodiment of this invention.

FIG. 12 is a system configuration diagram of a power converter according to an eleventh embodiment of this invention.

In the construction shown in FIG. 12, the main circuit portion is the same as the fourth embodiment shown in FIG. 4 and therefore, the chopper controller only will be described here. The chopper controller is in the construction shown below.

There is provided current detector 13 to detect chopper current I.CHP flowing through chopper reactor 6. Further, there is provided current detector 14 to detect inverter neutral current I.INV flowing to the neutral point of NPC inverter 2 from the neutral point of the three-phase DC voltage source. Detected chopper current I.CHP is subtracted from detected inverter neutral current I.INV and a difference between them is integrated by an integrator 26. The output of integrator 26 is input to voltage controller 23. Detected chopper current I.CHP is also input to stabilizing compensator 24. The output of stabilizing compensator 24 is subtracted from the output of voltage controller 23 and the difference is input to chopper controller 11. In chopper controller 11, the chopper duty is changed by the triangular wave comparing PWM method and a mean voltage at the connecting point of two switching devices 7, 8 is controlled.

According to the eleventh embodiment in the construction described above, actions and effects shown below are obtained. That is, by controlling a voltage difference between two DC capacitors 4, 5 to make it zero, the neutral potential fluctuation can be suppressed. An integral value of a difference between detected inverter neutral current I.INV and detected chopper current I.CHP has a dimension of voltage. That is, it is proportional to a voltage difference in two capacitors 4, 5. If this integral value is made zero by controlling voltages of capacitors 4, 5, the neutral potential fluctuation can be suppressed. However, even when voltages only are controlled, there is still some fear for LC resonance between chopper reactor 6 and DC capacitors 4, 5. Therefore, the neutral potential is stabilized by adding a compensation by detected chopper current I.CHP.

When a power converter is constructed as described above, it becomes possible to improve a voltage utilization factor of a converter and an inverter in the power converter, and it is also possible to achieve the downsizing or low pricing of the power a converter.

Figure 13:
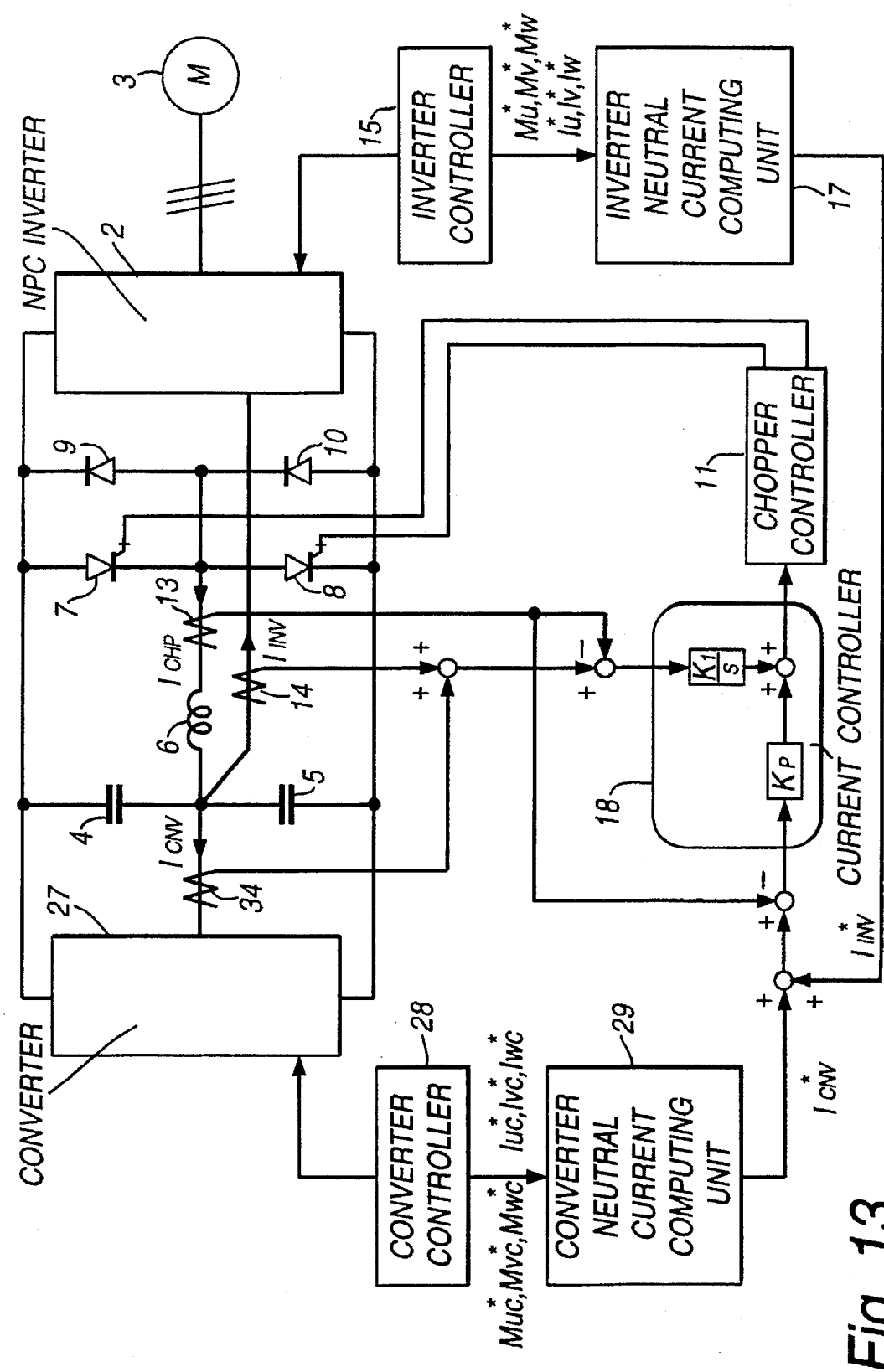
FIG. 13 is a system configuration diagram of a power converter according to a twelfth embodiment of this invention.

FIG. 13 is a system configuration diagram of a power. converter according to a twelfth embodiment of this invention. The construction shown in FIG. 13 is based on the construction shown in FIG. 8 and only a difference between FIGS. 8 and 13 will be described here.

In FIG. 8, a three-level DC voltage source is produced by connecting between the outputs of one two-level converter 1 two capacitors 4, 5 in series, while in FIG. 13 three levels of DC voltage source are produced by the three outputs of a three-level NPC converter 27. Therefore, the neutral point of three-level NPC converter 27 is connected to the connecting point of capacitors 4, 5. This is the point of difference in the main circuit.

As a point of difference in the chopper controller, there is provided a converter neutral current computing unit 29 which computes a converter neutral current I.CNV* flowing to the neutral point of three-level NPC converter 27 from the connecting point of capacitors 4, 5 according to information from a converter controller 28 which controls three-level NPC converter 27, as described below. In addition, a current detector 34 is provided to detect a converter neutral current I.CNV.

Voltage modulation factors of three phases of three-level NPC converter 27; MUc*, MVc* and MWc* and three-phase current references IUc*, IVc* and IWc* are input to converter neutral current computing unit 29 from converter controller 28. Converter neutral current I.CNV* is computed by converter neutral current computing unit 29 according to the following formula.

$$I.CNV^* = -|MUc^*|.IUc^* - |MVc^*|.IVc^* - |MWc^*|.IWc^* \quad (4)$$

Taking it into consideration that that current flowing to/out of the connecting point of capacitors 4, 5 is zero is sufficient for suppressing the neutral potential fluctuation, the construction shown in FIG. 8 is compared with that shown in FIG. 13. In the construction shown in FIG. 8, the current flowing into the connecting point of capacitors 4, 5 is chopper current I.CHP and the current flowing out therefrom is inverter neutral current I.INV. In the construction shown in FIG. 13, the current flowing into the connecting point of capacitors 4, 5 is chopper current I.CHP while inverter neutral current I.INV and converter neutral current I.CNV flow out therefrom. Therefore, for controlling the suppression of the neutral potential fluctuation, if inverter neutral current I.INV in the construction shown in FIG. 8 and an added value of inverter neutral current I.INV with converter neutral current I.CNV in the construction shown in FIG. 13 are regarded as the same, it is possible to control the suppression of neutral potential fluctuation.

Definitely, in the construction shown in FIG. 8, chopper current I.CHP is subtracted from inverter neutral current I.INV* computed by inverter neutral current computing unit 17, and the difference is input to current controller 18 for proportional control. In the construction shown in FIG. 13, chopper current I.CHP is subtracted from an added value of inverter neutral current I.INV* computed by inverter neutral current computing unit 17 and converter neutral current I.CNV* computed by converter neutral current computing unit 29, and the difference is input to current controller 18 for proportional control. Further, in the construction shown in FIG. 8, chopper current I.CHP detected by current detector 13 is subtracted from inverter neutral current I.INV detected by current detector 14, and the difference is input to current controller 18 for integral control. In the construction shown in FIG. 13, chopper current I.CHP detected by current detector 13 is subtracted from an added value of inverter neutral current I.INV detected by current detector 14 with converter neutral current I.CNV detected by a current detector 34, and the difference is input to current controller for integral control.

According to the twelfth embodiment in the construction as described above, the same actions and effects as those of the seventh embodiment shown in FIG. 8 are obtained. Although this embodiment is based on the construction shown in FIG. 8, it can be applied to the embodiments shown in FIGS. 4, 6, 7, 9, respectively, with the same actions and effects.

Further, various combinations are possible for the current control, for instance, using detected values as shown in the embodiment shown in FIG. 4 for inverter neutral current, or computed values as shown in the embodiment shown in FIG. 6 or 7 for converter neutral current.

Figure 14:
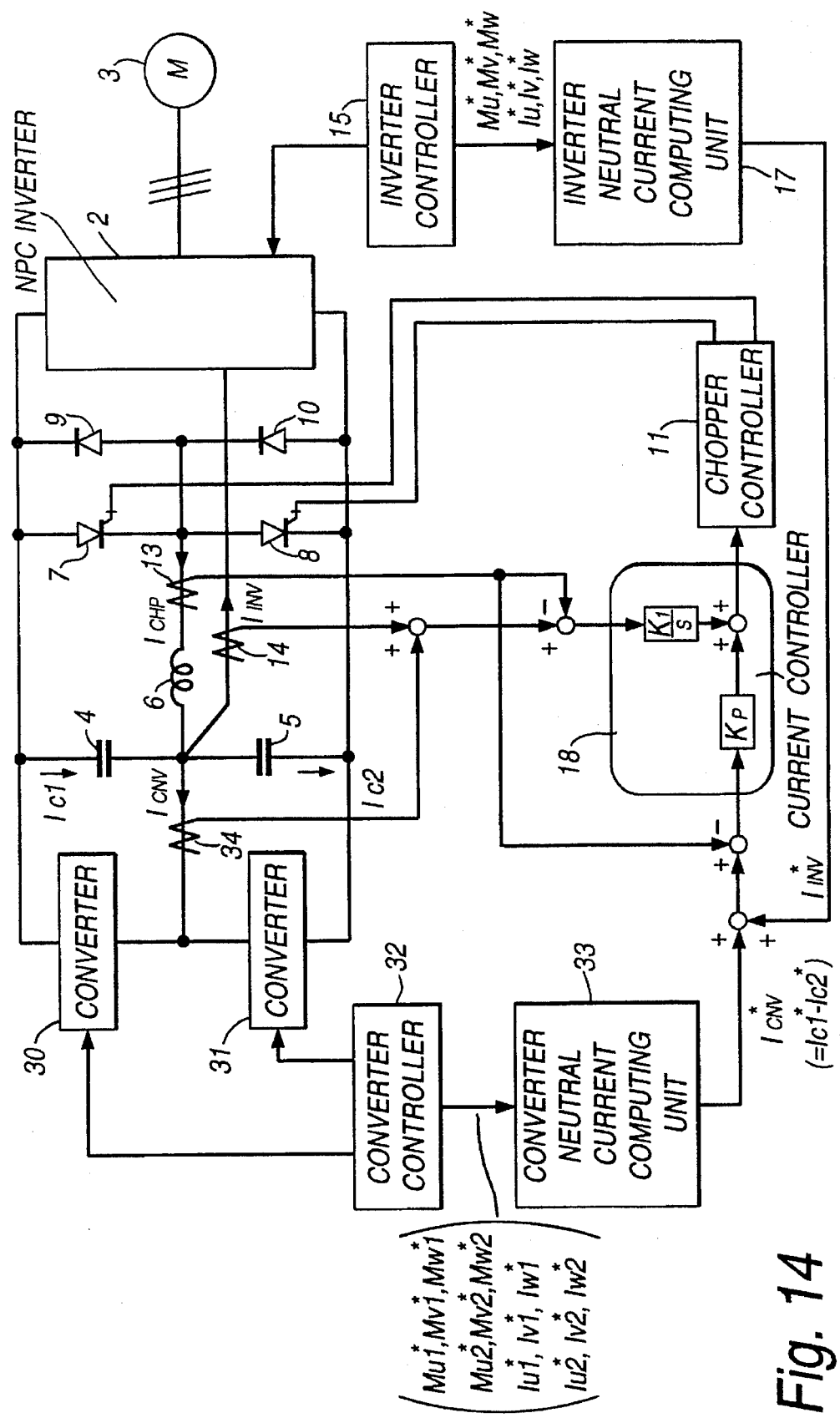
FIG. 14 is a system configuration diagram of a power converter according to a thirteenth embodiment of this invention.

FIG. 14 is a system configuration diagram of a power converter according to a thirteenth embodiment of this invention. The construction shown in FIG. 14 is based on the construction shown in FIG. 8. Only a difference between FIGS. 8 and 14 will be described here.

While a three-level DC voltage source is formed by connecting between the outputs of one two-level converter 1 two capacitors 4, 5 in series in FIG. 8, positive side voltage and negative side voltage of three-level DC voltage source are produced by two two-level converters 30, 31, respectively in FIG. 14. Therefore, the connecting point of the negative side potential point of two-level converter 30 and the positive side potential point of two-level converter 31 are connected to the connecting point of capacitors 4, 5. Two-level converters 30, 31 are composed of, such as, thyristor bridge circuits or diode bridge circuits, but they are not limited to such circuits. Points of difference in the constructions shown in FIGS. 8 and 14 are as described above.

A point of difference of the chopper controller is that there is provided a converter neutral current computing unit 33 which computes a converter neutral current I.CNV* flowing to the connecting point of two two-level converter 30, 31 from the connecting point of capacitors 4, 5 according to information from a converter controller 32 which controls two two-level converters 30, 31, as described below. In addition, there is provided current detector 34 to detect converter neutral current I.CNV.

Voltage modulation factors of three phases of converters 30, 31; MU1*, MV1*, MW1* and MU2*, MV2*, MW2*, and three-phase current references for converters 30 31; IU1* IV1* IW1* and IU2*, IV2*, IW2* are input to converter neutral current computing unit 33 from converter controller 32. Converter neutral current I.CNV* is computed by converter neutral current computing unit 33 according to the following formula.

$$IC1^* = -1/2(MU1^* \cdot IU1^* + MV1^* \cdot IV1^* + MW1^* \cdot IW1^*) \quad (5)$$

$$IC2^* = -1/2(MU2^* \cdot IU2^* + MV2^* \cdot IV2^* + MW2^* \cdot IW2^*)$$

$$I \cdot CNV^* = IC1^* - IC2^*$$

Here, IC1 and IC2 are currents flowing through capacitors 4 and 5, respectively, and IC1 and IC2 are currents computed by converter neutral current computing unit 33 corresponding to currents IC1, IC2, respectively.

Taking it into consideration that that current flowing to/out of the connecting point of capacitors 4, 5 is zero is sufficient for suppressing the neutral potential fluctuation, the construction shown in FIG. 8 is compared with that shown in FIG. 14. In the construction shown in FIG. 8, the current flowing into the connecting point of capacitors 4, 5 is chopper current I.CHP and the current flowing out therefrom is inverter neutral current I.INV.

Further, in the construction shown in FIG. 14, the current flowing into the connecting point is chopper current I.CHP while inverter neutral current I.INV and converter neutral current I.CNV flow out therefrom. Therefore, for controlling the suppression of the neutral potential fluctuation, if inverter neutral current I.INV in the construction shown in FIG. 8 and an added value of inverter neutral current I.INV with converter neutral current I.CNV in the construction shown in FIG. 14 are regarded as the same, it is possible to control the suppression of neutral potential fluctuation.

Definitely, in the construction shown in FIG. 8, chopper current I.CHP is subtracted from inverter neutral current I.INV* computed by inverter neutral current computing unit 17 and the difference is input to current controller 18 fop proportional control. In the construction shown in FIG. 14, chopper current I.CHP is subtracted from an added value of inverter neutral current I.INV* computed by inverter neutral current computing unit 17 and converter neutral current I.CNV* computed by converter neutral current computing unit 33, and the difference is input to current controller 18 fop proportional control.

Further, in the construction shown in FIG. 8, chopper current I.CHP detected by current detector 13 is subtracted from inverter neutral current I.INV detected by current detector 14 and the difference is input to current controller 18 fop integral control. In the construction shown in FIG. 14, chopper current I.CHP detected by current detector 13 is subtracted from an added value of inverter neutral current I.INV detected by current detector 14 and converter neutral current I.CNV detected by current detector 34, and the difference is input to current controller 18 for integral control.

According to the thirteenth embodiment constructed as described above, the same actions and effects as those of the embodiment shown in FIG. 8 are obtained.

Although this embodiment is based on the construction shown in FIG. 8, it can be applied to the embodiments shown in FIGS. 4, 6, 7, 9, respectively, with the same actions and effects.

Further, various combinations are possible for the current control, for instance, using detected values as shown in the embodiment shown in FIG. 4 for inverter neutral current, or computed values as shown in the embodiment shown in FIG. 6 or 7 for converter neutral current.

According to the present invention, it is possible to provide a power converter equipped with two series connected capacitors to obtain neutral potential by dividing DC voltage and an NPC inverter to convert DC voltage into AC voltage, which is capable of directly controlling the suppression of neutral potential fluctuation independently of the inverter control and displaying the more certain and highly reliable NPC inverter functions.

According to the present invention, it is possible to suppress the DC neutral potential fluctuation as well as AC neutral potential fluctuation, because the neutral potential fluctuation of a DC voltage source is compensated using a chopper circuit.

Therefore, as it is unnecessary to perform the control of suppression of neutral potential fluctuation by an inverter or a converter, it becomes possible to improve a voltage utilization factor of a converter or an inverter in the power converter. Accordingly, it is possible to use a power converter with less voltage capacity and the downsizing of a power converter can be expected.

Obviously, numerous modifications and variations of the present invention are possible in light of the above teachings. It is therefore to be understood that within the scope of the appended claims, the invention may be practiced otherwise than as specifically described herein.

What is claimed is:

1. A power converter, comprising:

a converter;

a three-level DC voltage source, composed of a series connected capacitors connected between outputs of said converter, to generate a positive potential, a neutral potential and a negative potential;

a three-level NPC inverter connected to said three-level DC voltage source;

a chopper circuit; and chopper control means for controlling said chopper circuit;

said chopper circuit including, a series circuit of a first switching device and a second switching device connected between a positive potential point and a negative potential point of said three-level DC voltage source, a first diode connected in antiparallel with said first switching device, a second diode connected in antiparallel with said second switching device, and a reactor, an anode of said first switching device being connected to said positive side potential point of said three-level DC voltage source, a cathode of said first switching device being connected to an anode of said second switching device, a cathode of said second switching device being connected to said negative side potential point of said three-level DC voltage source, said reactor being connected between a neutral potential point of said three-level DC voltage source and a connecting point of said first and second switching devices;

said chopper control means including, first voltage detecting means for detecting a first voltage between one of said capacitors, second voltage detecting means for detecting a second voltage between the other of said capacitors, voltage control means connected to receive said first voltage and said second voltage for comparing said first voltage with said second voltage to generate a voltage difference and for generating a voltage control output signal so that said voltage difference becomes zero, and control means connected to receive said voltage control output signal for driving said first and second switching devices based on said voltage control output signal;

whereby to suppress the fluctuation of said neutral potential of said three-level DC power source.

2. A power converter, comprising:

a converter;

a three-level DC voltage source, composed of a series connected capacitors connected between outputs of said converter, to generate a positive potential, a neutral potential and a negative potential;

a three-level NPC inverter connected to said three-level DC voltage source;

a chopper circuit; and chopper control means for controlling said chopper circuit;

said chopper circuit including, a series circuit of a first switching device and a first reactor connected in the forward direction between a positive potential point and a neutral point of said three-level DC power source, a first diode connected in the reverse direction between a connecting point of said first switching device and said first reactor and a negative potential point of said three-level DC power source, a series circuit of a second switching device and a second reactor connected in the forward direction between said negative potential point and said neutral point of said three-level DC power source, a second diode connected in the reverse direction between a connecting point of said second switching device and said second reactor and said positive potential point of said three-level DC power source, said chopper control means including, first voltage detecting means for detecting a first voltage between one of said capacitors, second voltage detecting means for detecting a second voltage between the other of said capacitors, voltage control means connected to receive said first voltage and said second voltage for comparing said first voltage with said second voltage to generate a voltage difference and for generating a voltage control output signal so that said voltage difference becomes zero, and control means connected to receive said voltage control output signal for driving said first and second switching devices based on said voltage control output signal;

whereby to suppress the fluctuation of said neutral potential of said three-level DC power source.

3. The power converter according to claim 1 or 2, wherein: said control means includes pulse width modulation control means for turning ON one of said first and second switching devices determined by the polarity of said voltage difference of said voltage control output signal at a pulse width corresponding to said voltage difference of said voltage control output signal.

4. A power converter, comprising:

a converter;

a three-level DC voltage source, composed of a series connected capacitors connected between outputs of said converter, to generate a positive potential, a neutral potential and a negative potential;

a three-level NPC inverter connected to said three-level DC voltage source;

a chopper circuit; and chopper control means for controlling said chopper circuit;

said chopper circuit including, a series circuit of a first arm and a second arm connected between a positive side potential point and a negative side potential point of said three-level DC voltage source, each of said first and second arms composed of a series circuit of a first switching device and a second switching device, a first diode connected in antiparallel with said first switching device, and a second diode connected in antiparallel with said second switching device, a third diode connected between a neutral potential point of said three-level DC voltage source and a connecting point of said first and second switching devices in said first arm, a fourth diode connected between said neutral potential point of said three-level DC voltage source and a connecting point of said first and second switching devices in said second arm, and a reactor connected between said neutral potential point of said three-level DC voltage source and a connecting point of said first and second arms, an anode of said first switching device of said first arm being connected to said positive side potential point of said three-level DC voltage source, a cathode of said second switching device of said first arm being connected to an anode of said first switching device of said second arm, a cathode of said second switching device of said second arm being connected to said negative side potential point of said three-level DC voltage source;

said chopper control means including, first voltage detecting means for detecting a first voltage between one of said capacitors, second voltage detecting means for detecting a second voltage between the other of said capacitors, voltage control means connected to receive said first voltage and said second voltage for comparing said first voltage with said second voltage to generate a voltage difference and for generating a voltage control output signal so that said voltage difference becomes zero, and control means connected to receive said voltage control output signal for driving said first and second switching devices in said first and second arms based on said voltage control output signal, such that one arm of said first and second arms is turned ON based on said voltage control output signal and a current is flown through said reactor from one of said capacitors, then said switching device of said three-level DC voltage source side is turned OFF and said current flowing through said reactor is circulated and stored through one of said third and fourth diodes, and then said switching device of the other side is turned OFF and said current stored in said reactor is discharged through the other of said capacitors and the other arm;

whereby to suppress the fluctuation of said neutral potential of said three-level DC power source.

5. The power converter according to claim 4, wherein:

said control means includes pulse width modulation control means for generating a first switching signal to turn ON one of said first and second arms determined by the polarity of said voltage difference of said voltage control output signal at a pulse width corresponding to said voltage difference of said voltage control output signal, and for generating a second switching signal for generating an ON command at the same time when said first switching signal generates an ON command and for generating an OFF command at a predetermined time after said first switching signal generates an OFF command; and said first switching signal is applied to one of said first and second switching device at said three-level DC voltage source side, and said second switching signal is applied to the other of said first and second switching devices.

6. A power converter, comprising:

a converter;

a three-level DC voltage source, composed of a series connected capacitors connected between outputs of said converter, to generate a positive potential, a neutral potential and a negative potential;

a three-level NPC inverter connected to said three-level DC voltage source;

a chopper circuit; and chopper control means for controlling said chopper circuit;

said chopper circuit including, a series circuit of a first switching device and a second switching device connected between a positive potential point and a negative potential point of said three-level DC voltage source, a first diode connected in antiparallel with said first switching device, a second diode connected in antiparallel with said second switching device, and a reactor, an anode of said first switching device being connected to said positive side potential point of said three-level DC voltage source, a cathode of said first switching device being connected to an anode of said second switching device, a cathode of said second switching device being connected to said negative side potential point of said three-level DC voltage source, said reactor being connected between a neutral potential point of said three-level DC voltage source and a connecting point of said first and second switching devices;

said chopper control means including, first current detecting means for detecting a chopper current flowing through said reactor, second current detecting means for detecting an inverter neutral current flowing between said neutral potential point of said three-level DC voltage source and a neutral potential point of said three-level NPC inverter, comparator means for comparing said inverter neutral current with said chopper current to generate a current difference therebetween, current control means connected to receive said current difference for generating a current control output signal so that said current difference becomes zero, and control means connected to receive said current control output signal for driving said first and second switching devices based on said current control output signal.

7. A power converter, comprising:

a converter;

a three-level DC voltage source, composed of a series connected capacitors connected between outputs of said converter, to generate a positive potential, a neutral potential and a negative potential;

a three-level NPC inverter connected to said three-level DC voltage source;

a chopper circuit; and chopper control means for controlling said chopper circuit;

said chopper circuit including, a series circuit of a first switching device and a second switching device connected between a positive potential point and a negative potential point of said three-level DC voltage source, a first diode connected in antiparallel with said first switching device, a second diode connected in antiparallel with said second switching device, and a reactor, an anode of said first switching device being connected to said positive side potential point of said three-level DC voltage source, a cathode of said first switching device being connected to an anode of said second switching device, a cathode of said second switching device being connected to said negative side potential point of said three-level DC voltage source, said reactor being connected between a neutral potential point of said three-level DC voltage source and a connecting point of said first and second switching devices;

said chopper control means including, first current detecting means for detecting a chopper current flowing through said reactor, inverter neutral current computing means for computing an inverter neutral current flowing between said neutral potential point of said three-level DC voltage source and a neutral potential point of said three-level NPC inverter, comparator means for comparing said computed inverter neutral current with said chopper current to generate a current difference therebetween, current control means connected to receive said current difference for generating a current control output signal so that said current difference becomes zero, and control means connected to receive said current control output signal for driving said first and second switching devices based on said current control output signal.

8. The power converter according to claim 7:

wherein said chopper control means further includes second current detecting means for detecting three-phase currents flowing between said three-level NPC inverter and a load of said three-level NPC inverter; and wherein said inverter neutral current computing means receives said three-phase currents from said second current detecting means and an information for controlling said three-level NPC inverter from an inverter control circuit for controlling said three-level NPC inverter and computes said inverter neutral current based on said three-phase currents and said information.

9. The power converter according to claim 7:

wherein said inverter neutral current computing means receives an information for controlling said three-level NPC inverter from an inverter control circuit for controlling said three-level NPC inverter and computes said inverter neutral current based on said information.

10. A power converter, comprising:

a converter;

a three-level DC voltage source, composed of a series connected capacitors connected between outputs of said converter, to generate a positive potential, a neutral potential and a negative potential;

a three-level NPC inverter connected to said three-level DC voltage source;

a chopper circuit; and chopper control means for controlling said chopper circuit;

said chopper circuit including, a series circuit of a first switching device and a second switching device connected between a positive potential point and a negative potential point of said three-level DC voltage source, a first diode connected in antiparallel with said first switching device, a second diode connected in antiparallel with said second switching device, and a reactor, an anode of said first switching device being connected to said positive side potential point of said three-level DC voltage source, a cathode of said first switching device being connected to an anode of said second switching device, a cathode of said second switching device being connected to said negative side potential point of said three-level DC voltage source, said reactor being connected between a neutral potential point of said three-level DC voltage source and a connecting point of said first and second switching devices;

said chopper control means including, first current detecting means for detecting a chopper current flowing through said reactor, second current detecting means for detecting an inverter neutral current flowing between said neutral potential point of said three-level DC voltage source and a neutral potential point of said three-level NPC inverter, inverter neutral current computing means for computing an inverter neutral current flowing between said neutral potential point of said three-level DC voltage source and a neutral potential point of said three-level NPC inverter, first comparator means for comparing said computed inverter neutral current with said chopper current to generate a first current difference therebetween, second comparator means for comparing said detected inverter neutral current with said chopper current to generate a second current difference therebetween, current control means connected to receive said first and second current differences for generating a current control output signal so that said first and second current differences become zero, and control means connected to receive said current control output signal for driving said first and second switching devices based on said current control output signal, said current control means including a proportional compensator connected to receive said first current difference for proportional control, an integral compensator connected to receive said second current difference for integral control and an adder for adding an output of said proportional compensator and an output of said integral compensator to generate said current control output signal so that said first and second current differences become zero.

11. The power converter according to any one of claims 6–10:

wherein said chopper control means further includes, first voltage detecting means for detecting a first voltage between one of said capacitors, second voltage detecting means for detecting a second voltage between the other of said capacitors, voltage comparator means for comparing said first voltage with said second voltage to generate a voltage difference, voltage compensation means connected to receive said voltage difference for generating a voltage control output signal so that said voltage difference becomes zero, and adder means for adding said current control output signal from said current control means and said voltage control output signal from said voltage compensation means; and wherein said control means receives an output signal of said adder means instead of said current control output signal and drives said first and second switching devices based on said output signal of said adder means.

12. A power converter, comprising:

a converter;

a three-level DC voltage source, composed of a series connected capacitors connected between outputs of said converter, to generate a positive potential, a neutral potential and a negative potential;

a three-level NPC inverter connected to said three-level DC voltage source;

a chopper circuit; and chopper control means for controlling said chopper circuit;
said chopper circuit including,
  a series circuit of a first switching device and a second switching device connected between a positive potential point and a negative potential point of said three-level DC voltage source,
  a first diode connected in antiparallel with said first switching device,
  a second diode connected in antiparallel with said second switching device, and
  a reactor,
  an anode of said first switching device being connected to said positive side potential point of said three-level DC voltage source,
  a cathode of said first switching device being connected to an anode of said second switching device,
  a cathode of said second switching device being connected to said negative side potential point of said three-level DC voltage source,
  said reactor being connected between a neutral potential point of said three-level DC voltage source and a connecting point of said first and second switching devices;
said chopper control means including,
  first voltage detecting means for detecting a first voltage between one of said capacitors,
  second voltage detecting means for detecting a second voltage between the other of said capacitors,
  voltage comparator means for comparing said first voltage with said second voltage to generate a voltage difference,
  voltage control means connected to receive said voltage difference for generating a voltage control output signal so that said voltage difference becomes zero, and
  control means connected to receive said voltage control output signal for driving said first and second switching devices based on said voltage control output signal.

13. The power converter according to claim 12:
wherein said chopper control means further includes,
  first current detecting means for detecting a chopper current flowing through said reactor,
  a stabilizing compensator connected to receive said chopper current for proportional control, and
  subtractor means for subtracting an output signal of said stabilizing compensator from said voltage control output signal of said voltage control means; and
  wherein said control means receives an output signal of said subtractor means instead of said voltage control output signal and drives said first and second switching devices based on said output signal of said subtractor means.

14. The power converter according to claim 12:
wherein said chopper control means further includes,
  a false differentiator connected to receive said voltage difference for false differentiating said voltage difference,
  a stabilizing compensator connected to receive an output signal of said false differentiator for proportional control, and
  subtractor means for subtracting an output signal of said stabilizing compensator from said voltage control output signal of said voltage control means; and
  wherein said control means receives an output signal of said subtractor means instead of said voltage control output signal and drives said first and second switching devices based on said output signal of said subtractor means.

15. A power converter, comprising:
a converter;
a three-level DC voltage source, composed of a series connected capacitors connected between outputs of said converter, to generate a positive potential, a neutral potential and a negative potential;
a three-level NPC inverter connected to said three-level DC voltage source;
a chopper circuit; and
chopper control means for controlling said chopper circuit;
said chopper circuit including,
  a series circuit of a first switching device and a second switching device connected between a positive potential point and a negative potential point of said three-level DC voltage source,
  a first diode connected in antiparallel with said first switching device,
  a second diode connected in antiparallel with said second switching device, and
  a reactor,
  an anode of said first switching device being connected to said positive side potential point of said three-level DC voltage source,
  a cathode of said first switching device being connected to an anode of said second switching device,
  a cathode of said second switching device being connected to said negative side potential point of said three-level DC voltage source,
  said reactor being connected between a neutral potential point of said three-level DC voltage source and a connecting point of said first and second switching devices;
said chopper control means including,
  first current detecting means for detecting a chopper current flowing through said reactor,
  second current detecting means for detecting an inverter neutral current flowing between said neutral potential point of said three-level DC voltage source and a neutral potential point of said three-level NPC inverter,
  comparator means for comparing said inverter neutral current with said chopper current to generate a current difference,
  integrating means connected to receive said current difference for integrating said current difference,
  voltage control means connected to receive an output signal of said integrating means for generating a voltage control output signal so that said output signal of said integrating means becomes zero,
  a stabilizing compensator connected to receive said chopper current detected by said first current detecting means for proportional control, and
  subtractor means for subtracting an output signal of said stabilizing compensator from said voltage control output signal of said voltage control means, and
  control means connected to receive an output signal of said subtractor means for driving said first and second switching devices based on said output signal of said subtractor means.

16. The power converter according to any one of claims 6–10:
wherein said converter includes a three-level NPC converter;

wherein said neutral potential point of said three-level Dc power source is connected to a neutral potential point of said three-level NPC converter;

wherein said chopper control means includes,
- at least one of converter neutral current detecting means for detecting a converter neutral current flowing between said neutral potential point of said three-level DC power source and said neutral potential point of said three-level NPC converter, and converter neutral current computing means for computing a converter neutral current flowing between said neutral potential point of said three-level DC power source and said neutral potential point of said three-level NPC converter, and
- at least one of first adder means for adding said detected inverter neutral current and said detected converter neutral current, and second adder means for adding said computed inverter neutral current and said computed converter neutral current; and
- wherein in said chopper control means, at least one of outputs of said first and second adder means is used instead of at least one of said detected inverter neutral current and said computed inverter neutral current in the following control stage.

17. The power converter according to any one of claims 6–10:

wherein said converter includes a series connected two-level NPC converters;

wherein said neutral potential point of said three-level Dc power source is connected to a connecting point of said series connected two-level NPC converters;

wherein said chopper control means includes,
- at least one of converter neutral current detecting means for detecting a converter neutral current flowing between said neutral potential point of said three-level DC power source and said connecting point of said two-level NPC converters, and converter neutral current computing means for computing a converter neutral current flowing between said neutral potential point of said three-level DC power source and said connecting point of said two-level NPC converters, and
- at least one of first adder means for adding said detected inverter neutral current and said detected converter neutral current, and second adder means for adding said computed inverter neutral current and said computed converter neutral current; and
- wherein in said chopper control means, at least one of outputs of said first and second adder means is used instead of at least one of said detected inverter neutral current and said computed inverter neutral current in the following control stage.

* * * * *